US011924890B2

(12) United States Patent
Wänstedt et al.

(10) Patent No.: US 11,924,890 B2
(45) Date of Patent: Mar. 5, 2024

(54) ENABLING MANAGEMENT OF RANDOM ACCESS ATTEMPTS IN A WIRELESS COMMUNICATION SYSTEM

(71) Applicant: Telefonaktiebolaget LM Ericsson (publ), Stockholm (SE)

(72) Inventors: Stefan Wänstedt, Luleå (SE); Sara Sandberg, Luleå (SE); Magnus Thurfjell, Luleå (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/052,940

(22) PCT Filed: May 8, 2018

(86) PCT No.: PCT/SE2018/050478
§ 371 (c)(1),
(2) Date: Nov. 4, 2020

(87) PCT Pub. No.: WO2019/216798
PCT Pub. Date: Nov. 14, 2019

(65) Prior Publication Data
US 2021/0195635 A1 Jun. 24, 2021

(51) Int. Cl.
*H04W 74/00* (2009.01)
*H04W 8/24* (2009.01)

(52) U.S. Cl.
CPC ........... *H04W 74/085* (2013.01); *H04W 8/24* (2013.01); *H04W 74/008* (2013.01)

(58) Field of Classification Search
CPC ... H04W 74/085; H04W 8/24; H04W 74/008; H04W 4/06
See application file for complete search history.

(56) References Cited

U.S. PATENT DOCUMENTS

2008/0298325 A1* 12/2008 Vujcic ..................... H04L 47/14 370/336
2012/0033613 A1* 2/2012 Lin ..................... H04W 74/085 370/328

(Continued)

FOREIGN PATENT DOCUMENTS

WO 2013071200 A1 5/2013
WO 2017137060 A1 8/2017
WO WO-2017137060 A1 * 8/2017 ............... H04L 1/08

OTHER PUBLICATIONS

3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.1.0, Nov. 2015, 1-495.

(Continued)

*Primary Examiner* — Lakeram Jangbahadur
(74) *Attorney, Agent, or Firm* — Sage Patent Group

(57) ABSTRACT

There is provided a method, performed by a network unit, for enabling management of random access attempts in a wireless communication system by a plurality of devices having wireless communication capabilities. The method comprises obtaining (S1) information representing the load of random access attempts, and determining (S2), based on the information representing the load of random access attempts, control information for controlling a distribution of the random access attempts over time.

8 Claims, 22 Drawing Sheets

(56) References Cited

U.S. PATENT DOCUMENTS

| | | | | |
|---|---|---|---|---|
| 2012/0039171 | A1 | 2/2012 | Yamada et al. | |
| 2013/0170479 | A1* | 7/2013 | Fong | H04W 72/0446 370/336 |
| 2013/0184021 | A1 | 7/2013 | Jung et al. | |
| 2014/0171061 | A1* | 6/2014 | Larmo | H04W 48/18 455/422.1 |
| 2015/0173074 | A1 | 6/2015 | Zhao et al. | |
| 2017/0150294 | A1* | 5/2017 | Wang | H04W 56/00 |
| 2019/0044659 | A1* | 2/2019 | Alnås | H04W 16/26 |
| 2019/0053252 | A1* | 2/2019 | Park | H04W 72/56 |
| 2020/0100293 | A1* | 3/2020 | Larsson | H04W 74/0833 |
| 2020/0146065 | A1* | 5/2020 | You | H04W 74/006 |
| 2021/0195635 | A1* | 6/2021 | Wänstedt | H04W 8/24 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0, Mar. 2018, 1-341.

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.1.0, Mar. 2018, 1-109.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.1.0, Mar. 2018, 1-221.

Zhao, Yifeng, et al., "A Random-Access Algorithm Based on Statistics Waiting In LTE-M System", 12th International Conference on Computer Science and Education (ICCSE), Aug. 22-25, 2017, 1-5.

Supplementary European Search Report for European Patent Application No. 18918365.0, dated Apr. 15, 2021, 4 pages.

First Office Action dated Sep. 22, 2023 for Chinese Patent Application No. 201880093261.9, 14 pages.

* cited by examiner

ENABLING MANAGEMENT OF RANDOM ACCESS ATTEMPTS IN A WIRELESS COMMUNICATION SYSTEM

TECHNICAL FIELD

The proposed technology generally relates to wireless communications technology, and more particularly to methods for enabling management of random access attempts in a wireless communication, a network unit configured to enable management of random access attempts and a device having wireless communication capabilities and configured to enable management of a random access attempt, as well as corresponding computer programs and computer-program products and apparatuses, and a wireless communication system.

BACKGROUND

One of the challenges in wireless communications involving large numbers of wireless communication devices, such as the massive deployment of machine type communications and IoT (Internet of Things), is the risk for overload of the radio access part of the wireless communication system. When a high number of devices attempt to access the wireless communication system based on random access procedure(s), overload situations may occur, which in turn will affect the possibility for individual devices to access the system as well as overall system performance.

FIG. 1 is a schematic diagram illustrating an example of a wireless communication system in which wireless communication devices 10 may be served by a network unit/node 20. For example, the network unit/node 20 may be a radio access network node such as an access point or base station, e.g. an eNB. The network unit/node 20 may optionally be connected to a further network units and/or nodes such as a cloud-based network unit 30.

By way of example, there is a fundamental requirement in LTE, as in most cellular systems that the device itself needs to request a connection setup by transmitting a selected preamble sequence. This is commonly referred to as random access, e.g. involving the RACH (Random Access Channel) process.

For example, there are various triggers in 3GPP TS 36.300 (10.1.5) that let the device initiate a RACH process, such as, powering on the device. When and where a device transmits RACH is described in TS.36.211 and in TS.36.321 (e.g. section 5).

As an example, when a device attempts to establish a radio link (RRC_IDLE to RRC_CONNECTED), as described in TS 36.321 sub clause 5.1.1, the device needs to select a RACH preamble and needs to request a random access to eNB as shown in FIG. 2. In the following, the terms device and User Equipment (UE) will be used interchangeably.

FIG. 2 is a schematic signaling and/or action diagram illustrating an example of a contention-based random access procedure.

RACH Preamble (Message 1)

The UE selects one of the 64 available RACH preambles and needs to give an identity to the network so that the network can address it in the next step. The identity which the UE will use is called RA-RNTI (Random Access Radio Network Temporary Identity). RA-RNTI is determined from the time slot number in which the preamble is sent. If the UE does not receive any response from the network, it sends the RACH preamble again with higher output power.

RACH Response (Message 2)

The eNB sends a Random Access Response (RAR) to the UE on the DL-SCH (Downlink Shared Channel) addressed to the RA-RNTI.

The message carries a Temporary C-RNTI (TC-RNTI), a Timing Advance Value and an Uplink Grant Resource, where C-RNTI stands for Cell-RNTI. The eNB assigns another identity to UE, which is called Temporary C-RNTI, for further communication.

Further, the eNB informs the UE to change its timing using the Timing Advance Value in order to compensate for the round trip delay caused by the distance from the eNB to the UE. The network (eNB) will assign an initial resource and Uplink Grant Resource to the UE so that it can use the UL-SCH (Uplink shared channel).

RRC Connection Request (Message 3)

Using UL-SCH, the UE sends “RRC connection request message” to eNB. During this phase, the UE is identified by the temporary C-RNTI, which is assigned by the eNB as described above. The message also contains the following: UE identity such as Temporary Mobile Subscriber Identity (TMSI) or a random value, and a connection establishment cause value.

TMSI is used if the UE has previously been connected to the same network. With the TMSI value, the UE is identified in the core network. A random value is used if UE is connecting for the very first time to the network. The random value or TMSI helps to distinguish between UEs when the same TC-RNTI has been assigned to more than one UE (in the case of collisions which will be explained later). Furthermore, the connection establishment cause value shows the reason why UE needs to connect to the network.

Due to collisions, the eNB might not respond to a RRC Connection Request. If the terminal does not receive the RACH Response at the first trial, it just retries (resends) the preamble.

RRC Connection Set up (Message 4)

The eNB responds with a contention resolution message to the UE whose RRC Connection request was successfully received. This message is addressed towards the TMSI value or the random number and the TC-RNTI is promoted to C-RNTI, which is used for the further communication.

RACH Overload Control

Two important features to prevent RAN overload in LTE are Access Class Barring (ACB) and Extended Access Barring (EAB).

In ACB, all UEs are members of one out of ten randomly allocated mobile populations, defined as Access Classes (AC) 0 to 9. The population number is stored in the Subscriber Identification Module (SIM/USIM). In addition, UEs may be members of one or more out of 5 special categories (Access Classes 11 to 15), also held in the SIM/USIM, allocated to specific high priority users as follows:

15—PLMN Staff;
14—Emergency Services;
13—Public Utilities (e.g. water/gas suppliers);
12—Security Services;
11—For PLMN Use.

In case of an overload situation, the network may want to reduce the access load in the cell. To reduce the access from the UE, the network modifies the SIB2 (System Information Block Type 2). The UE draws a random number and only attempts to access the network if the random number is above a certain threshold signaled in SIB2. By varying the threshold the network load can be adjusted. UEs configured with a higher priority (i.e. UEs with access class (AC) 10-15) may be allowed to bypass the access control.

EAB is a complementing mechanism added in Rel-11, which is specifically designed for MTC. Since the EAB feature is only supported/understood by MTC UEs, it is effectively a mechanism to control the MTC load in the network. In EAB, the UE checks a bitmap signaled in SIB14 and only attempts to access the network if the bit corresponding to its access class is unset. By setting/unsetting bits in the bitmap the network load can be adjusted.

ACB and EAB can both be supported also in NarrowBand IoT (NB-IOT), although both mechanisms will likely not be used at the same time since they provide similar functionality. So far ACB has been discussed to be used for NB-IoT. In case too many UEs are allowed into the system by ACB the actual congestion may begin when the admitted UEs begin to transmit preambles.

In contrast to ACB and EAB, which take place before random access, LTE also supports two additional overload mechanisms. They are MAC Backoff Indicator (BI) and RRC wait timer, which are performed during the actual access attempt.

The MAC Backoff Indicator (BI) is included in RAR and controls the time between random access attempts. If RAR is received but none of the preamble identifiers match with the transmitted preamble or contention resolution fails, the UE will wait for a random amount of time (between 0 and BI) until it tries again.

The RRC wait timer (T302) controls the time until the next connection attempt and is signaled in Msg4 when a RRC connection is rejected. The range of this timer was extended for MTC devices ('Extended Wait Timer') in Rel-10.

These two mechanisms can help reduce congestion and resolve failed RACH attempts. However, they are not active until there has been a failed preamble transmission.

NB-IoT, mentioned above, is an emerging radio access for cellular internet of things (IoT) based on LTE, which addresses improved (indoor) coverage, support for massive number of low throughput devices, low delay sensitivity, ultra-low device cost, low device power consumption and (optimized) network architecture. A common assumption is that most NB-IoT devices will transmit mobile autonomous reporting periodic reports, once or a few times per day, e.g. see TR 45.820 Annex E.

With IoT fully deployed the number of UEs trying to access the network using RACH may be very high, thus causing a RACH load that is too high for the system since there are not enough resources. RACH resources, e.g., PRACH preambles can be congested in case a massive number of terminals access the system. Multiple terminals choose the same PRACH preamble. When N+1 number of UEs attempt to use the same RACH preamble (e.g. preamble X) at the same time then a collision occurs. In that case, the RRC connection might be successfully established for at most one UE, while the process is unsuccessful for the other N amount of UEs. Hence, they have to reinitiate the RA procedure by selecting a new RACH preamble randomly and then send a new random access requests.

Many NB-IoT devices, e.g. electricity meters, mainly transmit periodic reports on the uplink. It is likely that, e.g., electricity meters will be configured to send an uplink report at every hour sharp or exactly at midnight. This behavior might be even further plausible given a large stock of devices from same vendor, with same firmware and parameter settings all being deployed e.g. in same residential area. Such a behavior may make the load, and specifically the RACH load, very high at specific time instances even when the average load is fairly low.

There is thus a general need for improvements when it comes to management of random access attempts in a wireless communication system.

US 2012/033613 relates to an adaptive RACH operation is proposed for machine-type communications (MTC) in a 3GPP wireless network. The adaptive RACH operation is based on context information to reduce RACH collision probability, to control network overload, and to enhance system performance.

US 2013/170479 relates to a mechanism for initiating a random access procedure by a wireless device after EAB. The wireless device can release a bar on the wireless device. The bar can prevent the wireless device from accessing a node using EAB. The wireless device can count a random backoff time using a random backoff timer.

US 2014/171061 relates to a solution for controlling access of a user equipment configured for and activated to implement EAB or included in a group of UEs addressed via group paging to a wireless communication network. First, an access delay for the UE is determined, and then the timing of an attempt by the UE to access a cell in the wireless communication network is controlled based on the determined access delay.

US 2012/039171 relates to a method for controlling network congestion by detecting a potential overload of the network, and selecting an access class for which to change overload control information. The overload control information is adjusted for the selected access class, and then the adjusted overload control information is transmitted.

US 2013/184021 relates to a system access method for a user equipment performing machine-to-machine (M2M) communication with a system. The method is based on awaiting, when the user equipment detects a need for system access, reception of access delay information from a base station for a preset delay information wait time. The access delay information is based on a threshold level of congestion. The method further involves obtaining, when access delay information is received from the base station within the delay information wait time, an access delay time from the access delay information, and awaiting expiration of the access delay time while not attempting system access.

US 2017/150294 relates to desynchronized network access in M2M networks, where a group UE, e.g., a UE that is a member of a group of UEs, may be in an inactive mode. The group UE may receive a multicast message indicating that the group UE may enter an active mode. For example, the group UE may use the active mode for periodic reporting of its monitoring activity to the network. The multicast message may indicate a mechanism for the group UE to use to send an uplink transmission to the network. The group UE may send the uplink transmission to the network at a transmission time indicated by the mechanism. The transmission time may thus be desynchronized from other UEs in the group.

The article "A random-access algorithm based on statistics waiting in LTE-M system", by Zhao Yifeng et al., 12th International Conference on Computer Science and Education (ICCSE), 20170822, pp. 214-218 relates to a random-access algorithm based on statistical waiting, where a device initiating access to a network will receive a broadcast with the success rate of the last time slot. If the success rate is low, the device selects the next available access slot with a large probability to access the system.

SUMMARY

It is a general object to allow improvements in managing random access attempts in wireless communication systems.

It is an object to provide a method, performed by a network unit, for enabling management of random access attempts in a wireless communication.

Another object is to provide a method, performed by a device having wireless communication capabilities, for enabling management of a random access attempt in a wireless communication system.

It is also an object to provide a network unit configured to enable management of random access attempts in a wireless communication system.

Yet another object is to provide a device having wireless communication capabilities and configured to enable management of a random access attempt in a wireless communication system.

Still another object is to provide a computer program for enabling, when executed, management of random access attempts in a wireless communication system, and a corresponding a computer-program product.

It is also an object to provide a computer program for enabling, when executed, management of a random access attempt in a wireless communication system, and a corresponding a computer-program product.

It is also an object to provide an apparatus for enabling management of random access attempts in a wireless communication system.

Another object is to provide an apparatus for enabling management of a random access attempt in a wireless communication system.

These and other objects are met by embodiments of the proposed technology.

According to a first aspect, there is provided a method, performed by a network unit, for enabling management of random access attempts in a wireless communication system by a plurality of devices having wireless communication capabilities. The method comprises:

- obtaining information representing the load of random access attempts;
- determining, based on the information representing the load of random access attempts, control information for controlling a distribution of the random access attempts over time.

According to a second aspect, there is provided a method, performed by a device having wireless communication capabilities, for enabling management of a random access attempt in a wireless communication system. The device has at least one time instance intended for transmission of a random access request. The method comprises:

- defining a delay time window within which the transmission of the random access request is allowed to be delayed with respect to the intended time instance(s);
- determining a transmission time within the delay time window, wherein the length of the delay time window and/or the transmission time within the delay time window is/are determined based on device-specific information; and

- enabling transmission of the random access request at the determined transmission time.

In this way, it is possible to spread the random access attempts over time, which will positively improve system performance and/or avoid overload situations.

By way of example, it is possible to avoid situations involving overload of random access attempts, thereby reducing battery consumption since fewer random access attempts are needed. With the proposed solution there is a chance to be proactive and prevent collisions of random access attempts. In particular, the proposed technology may allow battery savings for IoT devices by utilizing the fact that IoT devices normally have relaxed delay requirements. Spreading random access attempts over time, may also improve overall system performance as fewer random access attempts in general are needed to successfully transmit a given amount of data.

According to a third aspect, there is provided a network unit configured to enable management of random access attempts in a wireless communication system by a plurality of devices having wireless communication capabilities. The network unit is configured to obtain information representing the load of random access attempts. The network unit is also configured to determine, based on the information representing the load of random access attempts, control information for controlling a distribution of the random access attempts over time.

According to a fourth aspect, there is provided a device having wireless communication capabilities and configured to enable management of a random access attempt in a wireless communication system. The device has at least one time instance intended for transmission of a random access request. The device is configured to define a delay time window within which the transmission of the random access request is allowed to be delayed with respect to the intended time instance(s). The device is also configured to determine a transmission time within the delay time window. More specifically, the device is configured to determine the length of the delay time window and/or the transmission time within the delay time window based on device-specific information. The device is further configured to enable transmission of the random access request at the determined transmission time.

According to a fifth aspect, there is provided a computer program for enabling, when executed, management of random access attempts in a wireless communication system by a plurality of devices having wireless communication capabilities. The computer program comprises instructions, which when executed by at least one processor, cause the at least one processor to:

- obtain information representing the load of random access attempts; and
- determine, based on the information representing the load of random access attempts, control information for controlling a distribution of the random access attempts over time.

According to a sixth aspect, there is provided a computer program for enabling, when executed, management of a random access attempt in a wireless communication system by a device having wireless communication capabilities, wherein the device has at least one time instance intended for transmission of a random access request. The computer program comprises instructions, which when executed by at least one processor, cause the at least one processor to:

- define a delay time window within which the transmission of the random access request is allowed to be delayed with respect to the intended time instance(s);
- determine a transmission time within the delay time window, wherein the length of the delay time window and/or the transmission time within the delay time window is/are determined based on device-specific information; and

- enable transmission of the random access request at the determined transmission time.

According to a seventh aspect, there is provided a computer-program product comprising a computer-readable medium having stored thereon a computer program as described above.

According to an eighth aspect, there is provided an apparatus for enabling management of random access attempts in a wireless communication system by a plurality of devices having wireless communication capabilities. The apparatus comprises:

- an information module for obtaining information representing the load of random access attempts; and
- a determination module for determining, based on the information representing the load of random access attempts, control information for controlling a distribution of the random access attempts over time.

According to a ninth aspect, there is provided an apparatus for enabling management of a random access attempt in a wireless communication system by a device having wireless communication capabilities, wherein the device has at least one time instance intended for transmission of a random access request. The apparatus comprises:

- a time window module for defining a delay time window within which the transmission of the random access request is allowed to be delayed with respect to the intended time instance(s);
- a determination module for determining a transmission time within the delay time window, wherein the length of the delay time window and/or the transmission time within the delay time window is/are determined based on device-specific information; and

- a preparation module for preparing transmission of the random access request at the determined transmission time.

According to a tenth aspect, there is provided a wireless communication system comprising a network unit according to the third aspect, and a device according to the fourth aspect.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
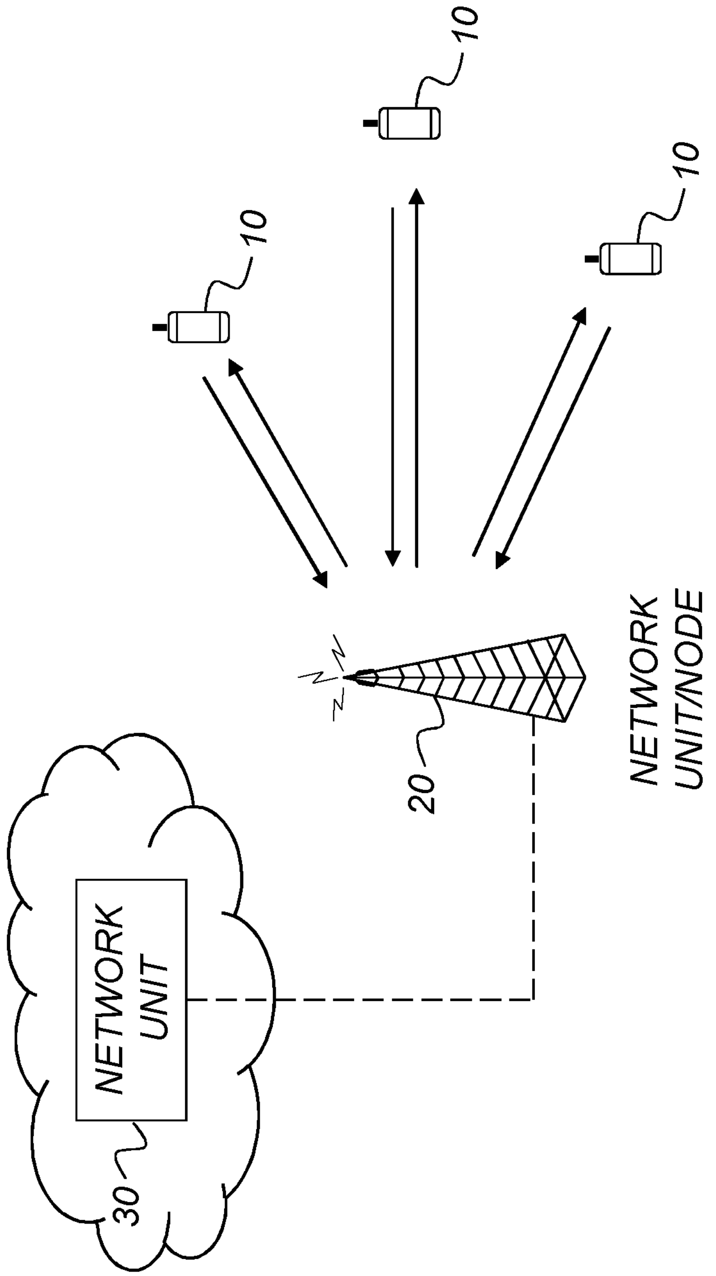
FIG. 1 is a schematic diagram illustrating an example of a wireless communication system in which wireless communication devices may be served by a network unit/node.
Figure 2:
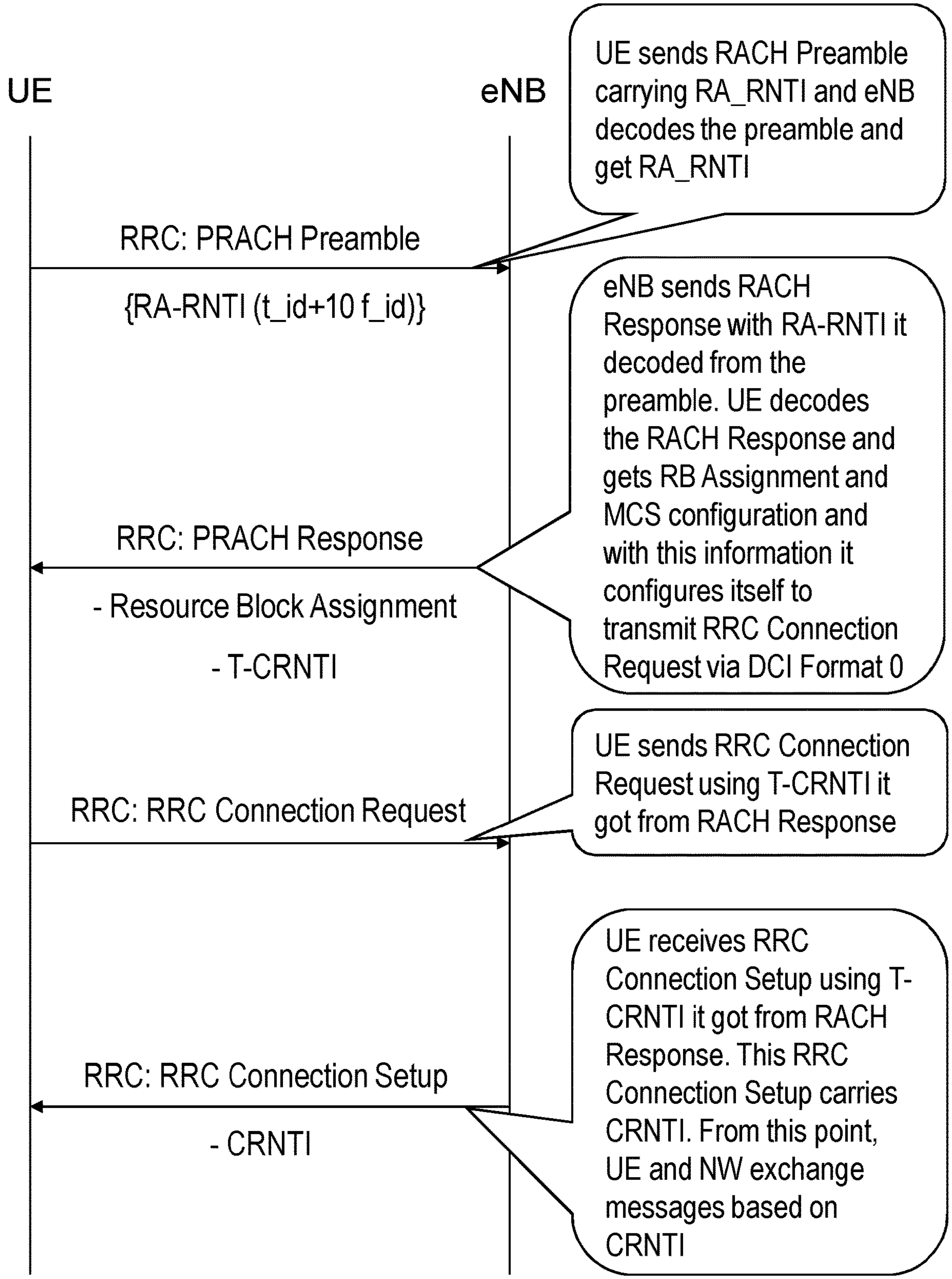
FIG. 2 is a schematic signaling and/or action diagram illustrating an example of a contention-based random access procedure.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, the non-limiting terms "wireless communication device", "station", "User Equipment (UE)", and "terminal" or "terminal device" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a Machine-to-Machine (M2M) device, a Machine Type Communication (MTC) device, an Internet of Thing (IoT) device, a Device-to-Device (D2D) UE, a machine type UE or UE capable of machine to machine communication, Customer Premises Equipment (CPE), Laptop Embedded Equipment (LEE), Laptop Mounted Equipment (LME), USB dongle, a portable electronic radio communication device, and/or a sensor device, meter, vehicle, household appliance, medical appliance, camera, television, radio, lightning arrangement and so forth equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network unit" may refer to any unit or device located in connection with a communication network, including but not limited to devices in access networks, core networks and similar network structures.

For example, the non-limiting term "network unit" may include network nodes such as network access nodes, base stations, various types of access points, radio network nodes, radio access controllers, and the like. In particular, the non-limiting term "base station" may refer to any kind of base stations and/or access points. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and radio control nodes controlling one or more Remote Radio Units (RRUs), or the like.

Sometimes, the term "network unit" may be used interchangeably with the term "network device", and also encompass cloud-based network units or devices.

Figure 3:
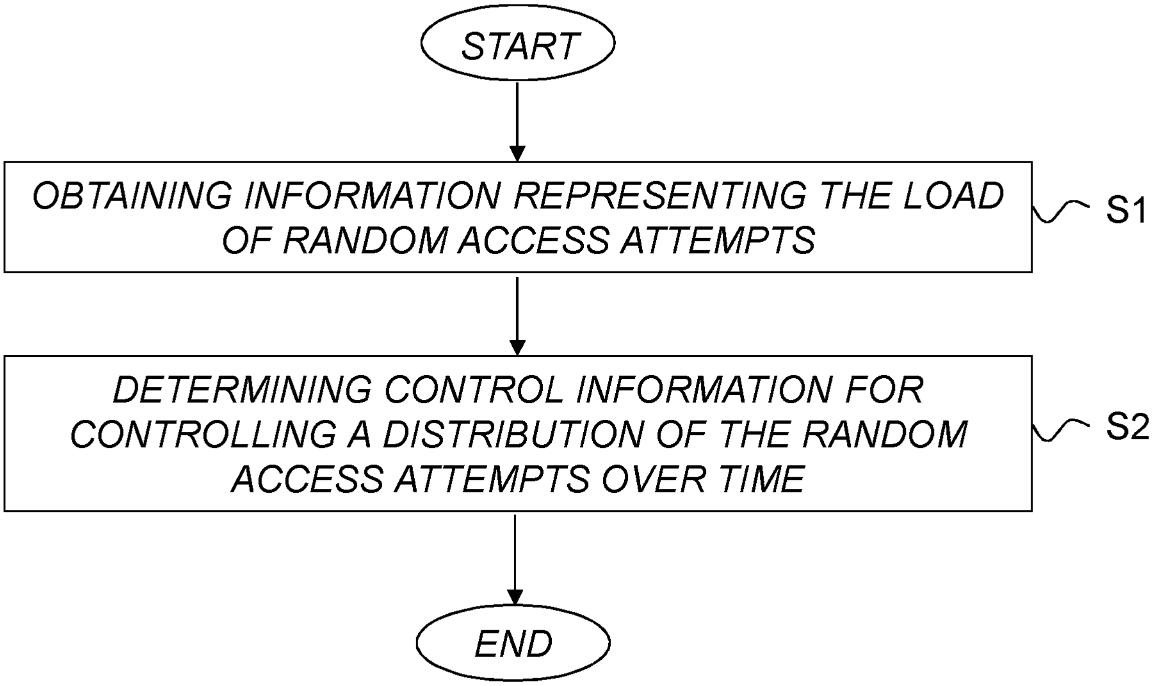
FIG. 3 is a schematic flow diagram illustrating an example of a method, performed by a network unit, for enabling management of random access attempts in a wireless communication system.

FIG. 3 is a schematic flow diagram illustrating an example of a method, performed by a network unit, for enabling management of random access attempts in a wireless communication system.

The method is designed for enabling management of random access attempts in a wireless communication system by a plurality of devices having wireless communication capabilities.

Basically, the method comprises:

S1: obtaining information representing the load of random access attempts; and S2: determining, based on the information representing the load of random access attempts, control information for controlling a distribution of the random access attempts over time.

In this way, it is possible to spread the random access attempts over time, which will positively improve system performance and/or avoid overload situations.

By way of example, it is possible to avoid situations involving overload of random access attempts, thereby reducing battery consumption since fewer random access attempts are needed. With the proposed solution there is a chance to be proactive and prevent collisions of random access attempts. In particular, the proposed technology may allow battery savings for IoT devices by utilizing the fact that IoT devices normally have relaxed delay requirements. Spreading random access attempts over time, may also improve overall system performance as fewer random access attempts in general are needed to successfully transmit a given amount of data.

Figure 4:
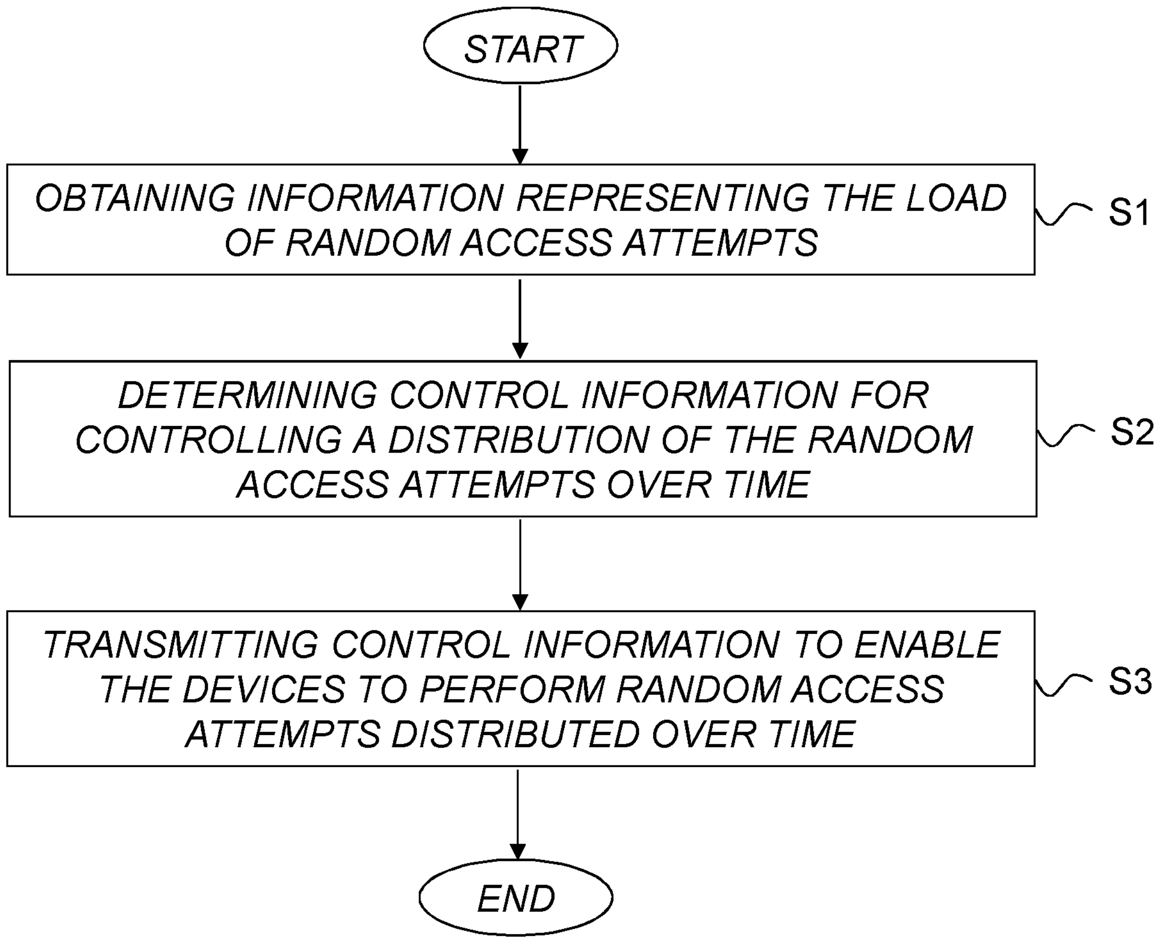
FIG. 4 is a schematic flow diagram illustrating another example of a method, performed by a network unit, for enabling management of random access attempts in a wireless communication system.

FIG. 4 is a schematic flow diagram illustrating another example of a method, performed by a network unit, for enabling management of random access attempts in a wireless communication system. In this particular example, the method further comprises transmitting S3 the control information to at least a subset of the devices to enable the devices to perform the random access attempts distributed over time.

Figure 5:
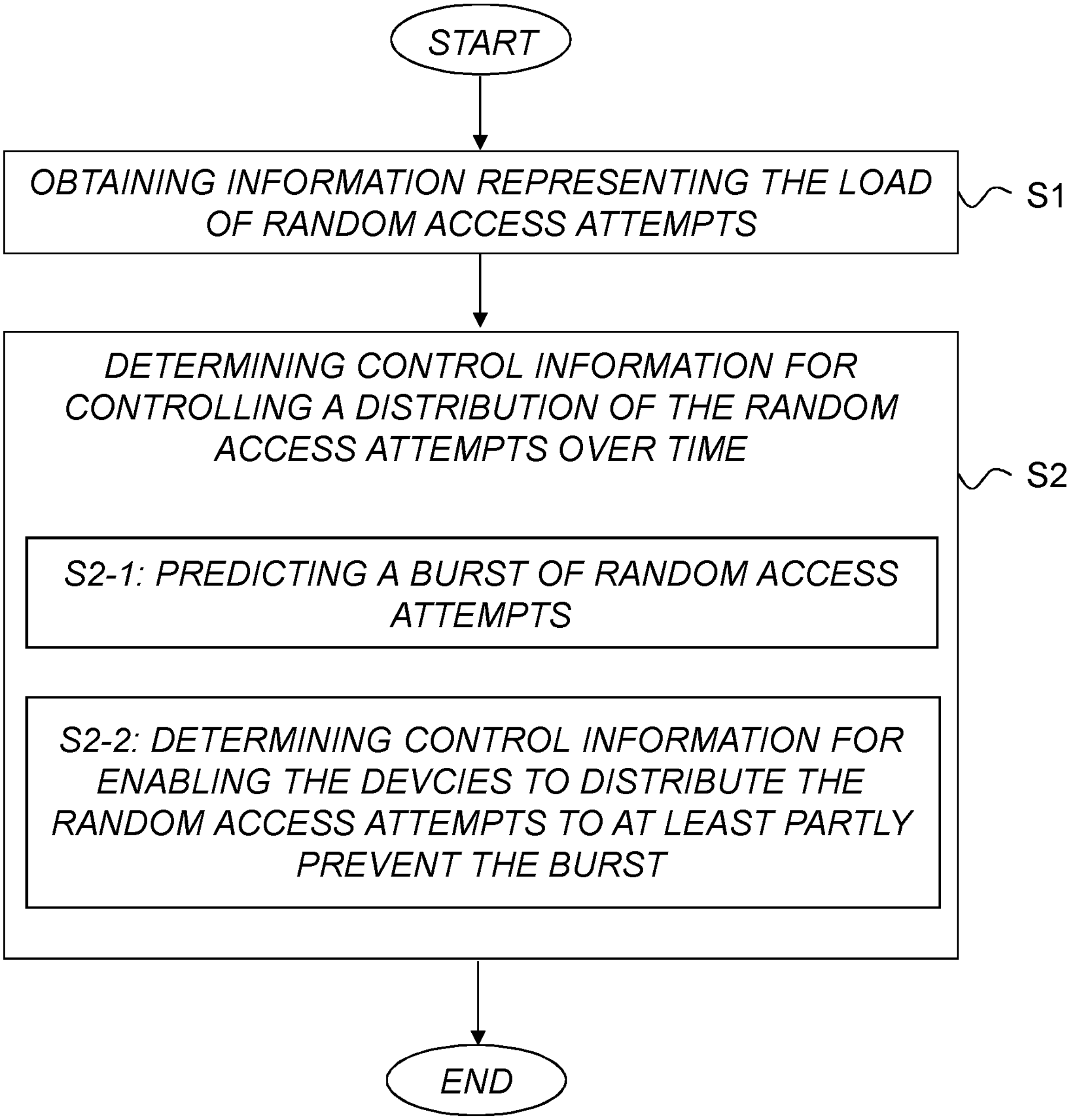
FIG. 5 is a schematic flow diagram illustrating a particular example of a method, performed by a network unit, for enabling management of random access attempts in a wireless communication system.

FIG. 5 is a schematic flow diagram illustrating a particular example of a method, performed by a network unit, for enabling management of random access attempts in a wireless communication system. In this example, the step S2 of determining control information for controlling a distribution of the random access attempts over time comprises:

S2-1: predicting a burst of random access attempts by the devices based on the information representing the load of random access attempts; and S2-2: determining, in response to a predicted burst of random access attempts, control information for enabling the devices to distribute the random access attempts over a period of time to at least partly prevent the burst of random access attempts.

For example, the control information may be transmitted to at least a subset of the devices for requesting the devices to distribute their random access attempts over a longer period of time, compared to when no burst of random access attempts is predicted.

Figure 6:
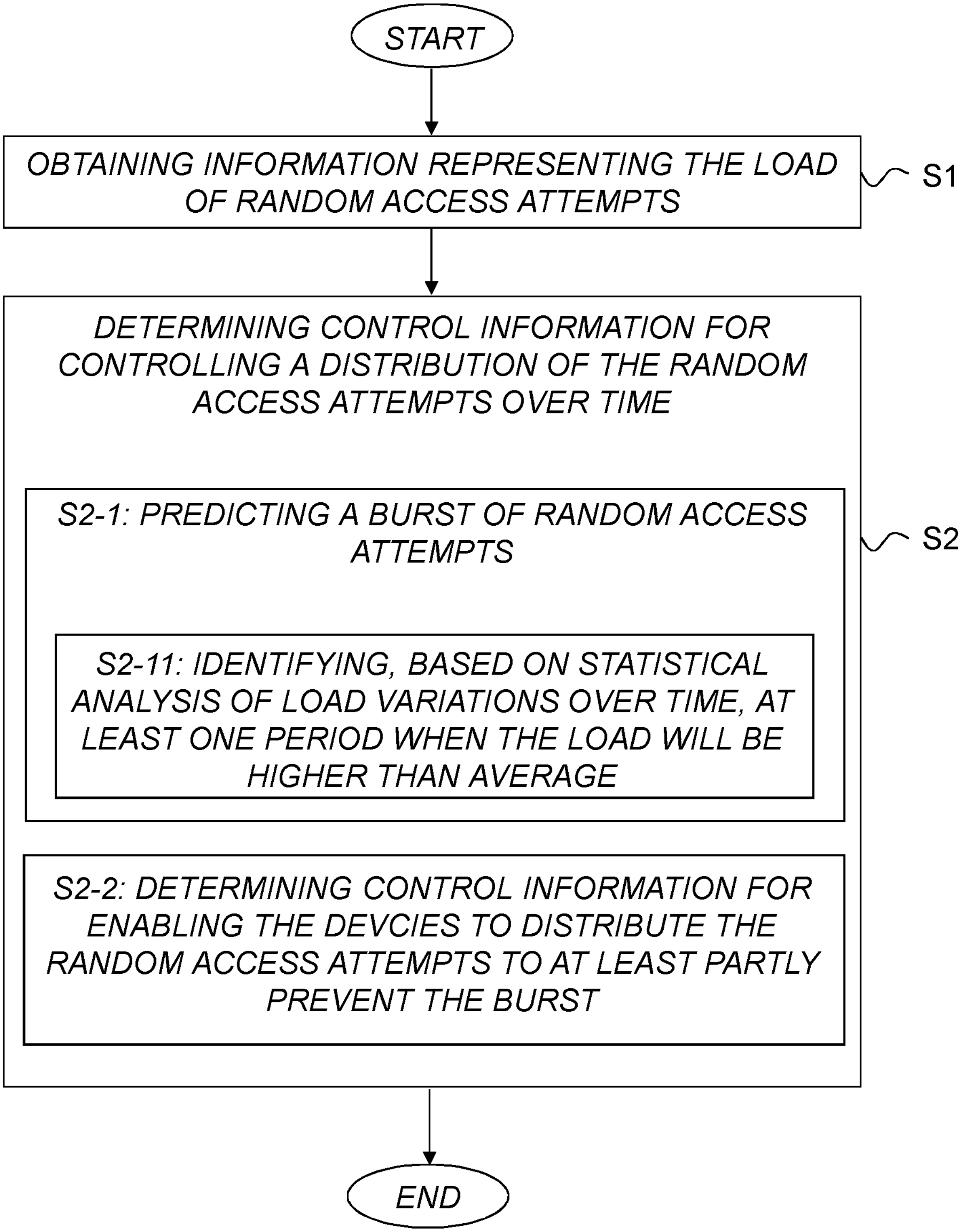
FIG. 6 is a schematic flow diagram illustrating another particular example of a method, performed by a network unit, for enabling management of random access attempts in a wireless communication system.

FIG. 6 is a schematic flow diagram illustrating another particular example of a method, performed by a network unit, for enabling management of random access attempts in a wireless communication system. In this particular example, the step S2-1 of predicting a burst of random access attempts comprises identifying S2-11, based on statistical analysis of load variations over time, at least one period when the load will be higher than average.

Figure 10:
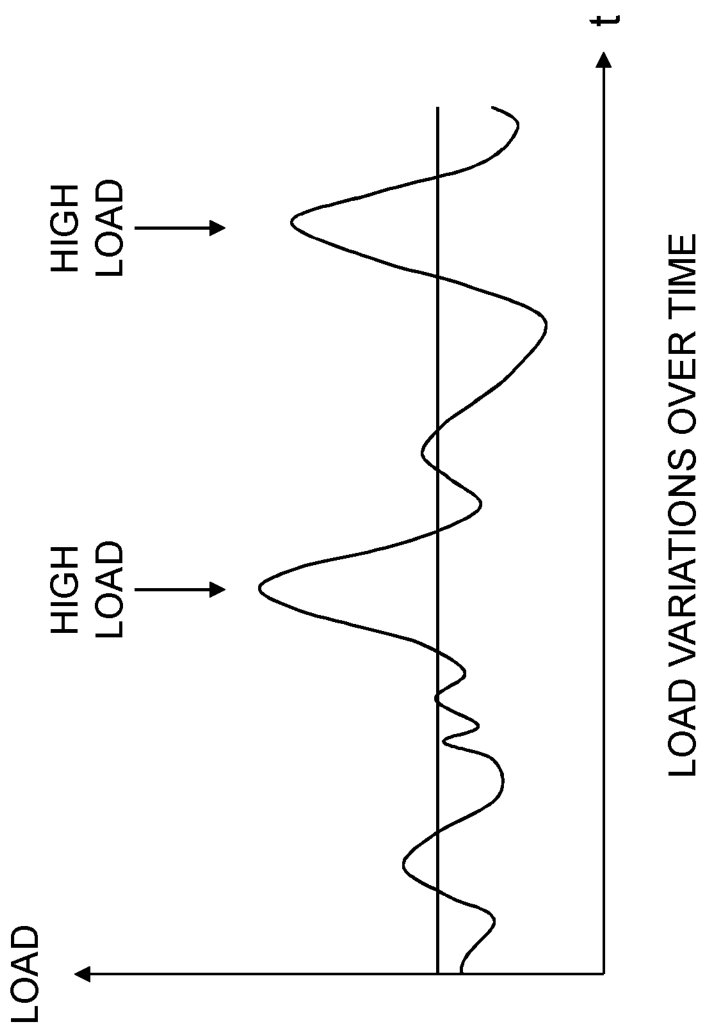
FIG. 10 is a schematic curve diagram illustrating an example of random access attempt load variations over time.

FIG. 10 is a schematic curve diagram illustrating an example of random access attempt load variations over time, indicating an example with two distinct periods with high load (above the average load).

For example, the random access attempts may be represented by Random Access Channel, RACH, preamble transmissions.

In other words, the random access attempts may include random access requests.

By way of example, the information representing the load of random access attempts may be represented by RACH load.

In a particular example, the control information enables the devices to spread the random access attempts at least partly to time periods during a day having lower load, compared to time periods having higher load.

For example, the control information may be determined based on information representing current load and/or historical load of random access attempts.

In a particular example, the control information may be represented by a relative delay factor informing each device to delay its random access attempt or attempts by a multiplicative factor of a device-specific delay value.

As an example, the relative delay factor may be a value between zero and one, informing each device to delay its random access attempt or attempts by a fraction of a predefined device-specific maximum delay.

Optionally, the network unit 20; 30 may be a network node 20. For example, the network node 20 may be a network access node.

Alternatively, or complementary, the network unit 20; 30 may be a computer-based network unit such as a cloud-based network unit 30.

By way of example, the wireless communication system may be based on Narrow Band Internet of Things, NB-IoT, radio access and the devices may include IoT devices.

Figure 7:
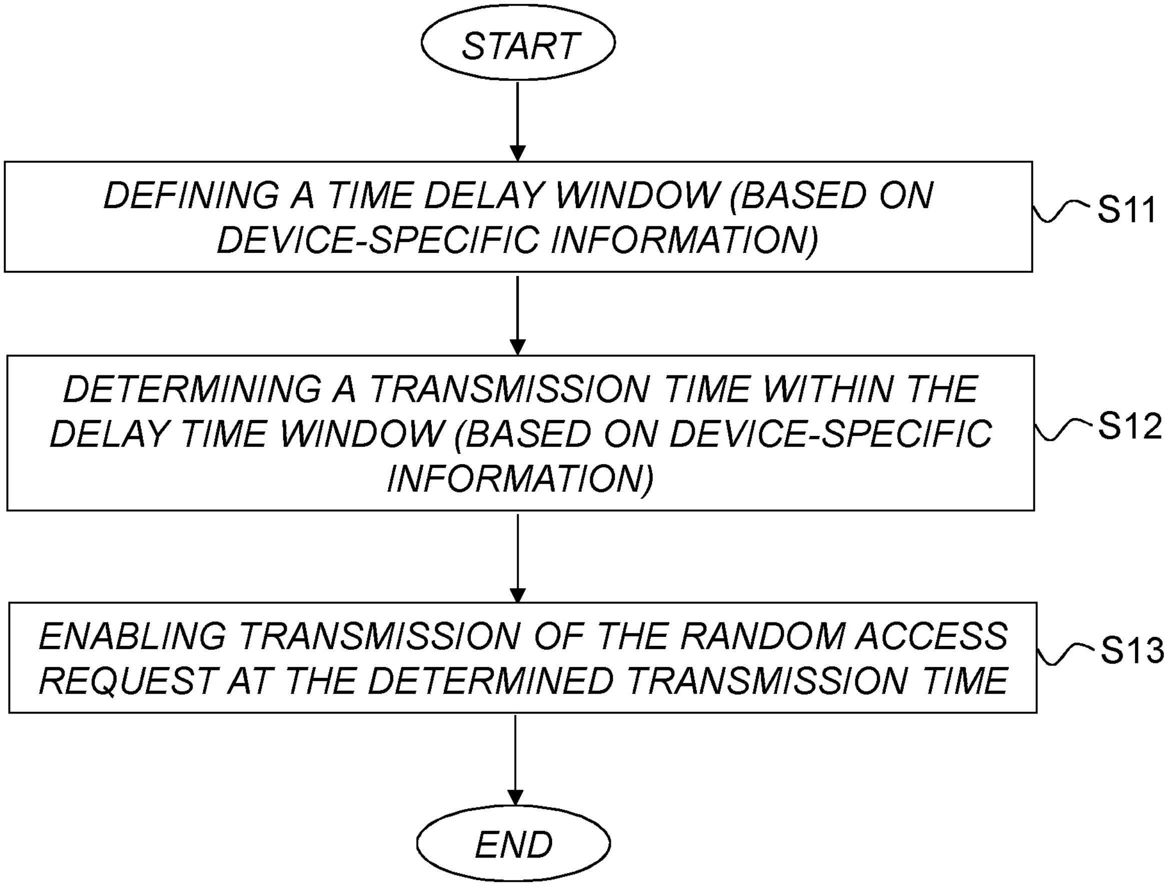
FIG. 7 is a schematic flow diagram illustrating an example of a method, performed by a device having wireless communication capabilities, for enabling management of a random access attempt in a wireless communication system.

FIG. 7 is a schematic flow diagram illustrating an example of a method, performed by a device having wireless communication capabilities, for enabling management of a random access attempt in a wireless communication system.

The method is designed for enabling management of a random access attempt in a wireless communication system. The device has at least one time instance intended for transmission of a random access request.

Basically, the method comprises:

S11: defining a delay time window within which the transmission of the random access request is allowed to be delayed with respect to the intended time instance(s);

S12: determining a transmission time within the delay time window, wherein the length of the delay time window and/or the transmission time within the delay time window is/are determined based on device-specific information; and

S13: enabling transmission of the random access request at the determined transmission time.

Figure 8:
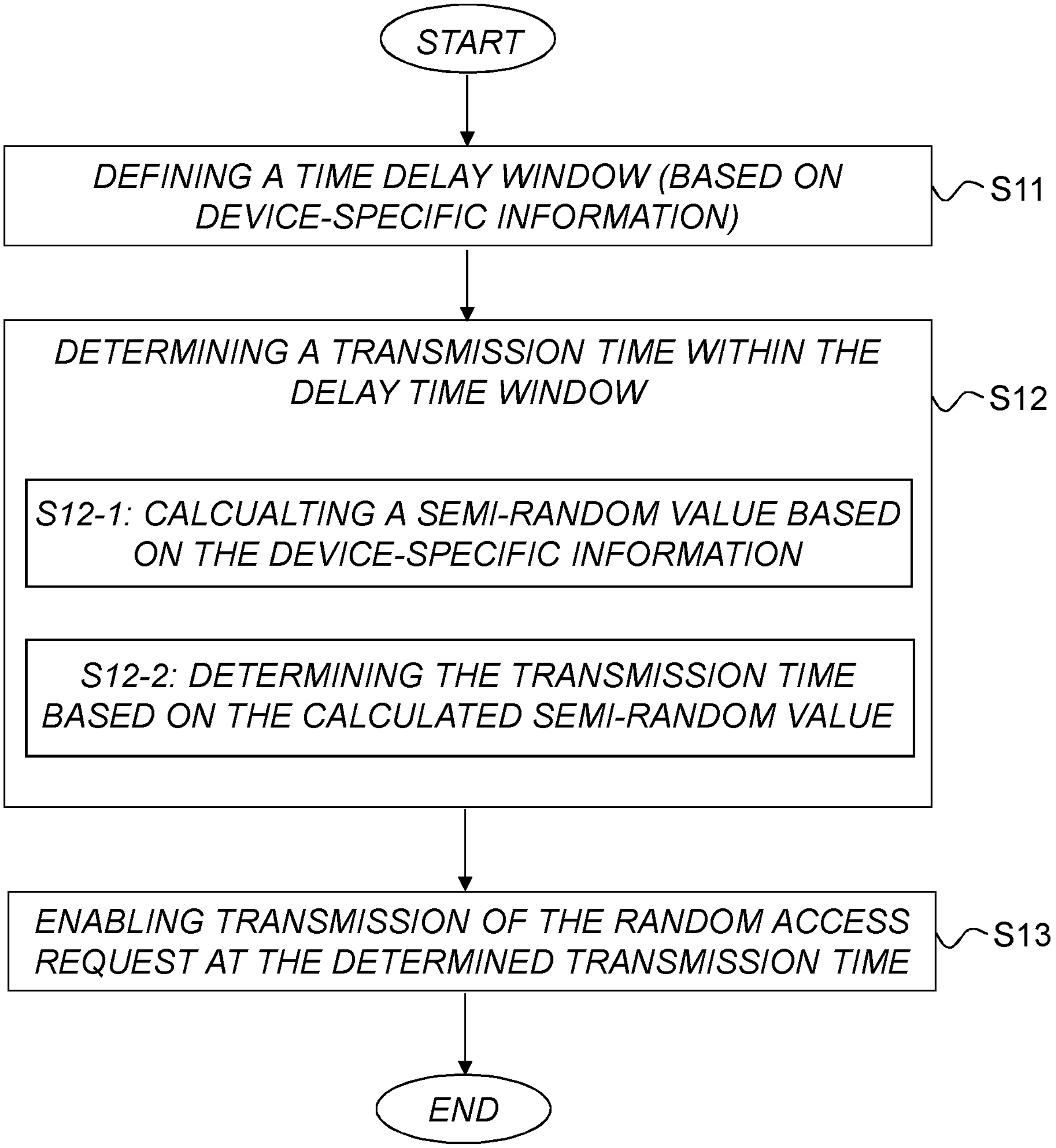
FIG. 8 is a schematic flow diagram illustrating a particular example of a method, performed by a device having wireless communication capabilities, for enabling management of a random access attempt in a wireless communication system.

FIG. 8 is a schematic flow diagram illustrating a particular example of a method, performed by a device having wireless communication capabilities, for enabling management of a random access attempt in a wireless communication system. In this particular example, the step S12 of determining a transmission time within the delay time window comprises:

S12-1: calculating a semi-random value based on the device-specific information;

S12-2: determining the transmission time based on the calculated semi-random value.

By way of example, the delay time window may correspond to a predefined device-specific maximum delay.

Figure 9:
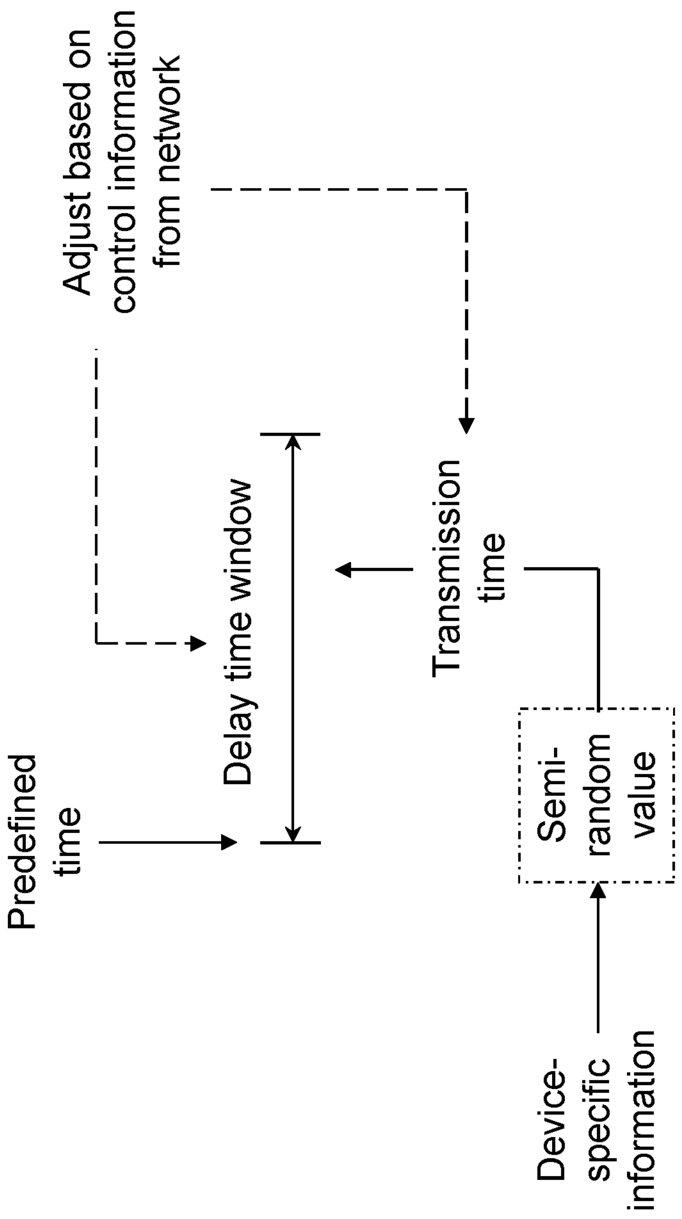
FIG. 9 is a schematic diagram illustrating an example of a delay time window within which transmission of a random access request is allowed to be delayed with respect to a predefined intended time instance for transmission.

FIG. 9 is a schematic diagram illustrating an example of a delay time window within which transmission of a random access request is allowed to be delayed with respect to a predefined intended time instance for transmission. As can be seen, the actual transmission time is determined within the delay time window based on device-specific information (optionally via a semi-random value).

As an example, the length of the delay time window may be adjusted and/or the transmission time within the delay time window may be determined based on control information received from a network node of the wireless communication system.

For example, the control information received from the network node may include a relative delay factor having a value between zero and one, informing the device to delay transmission of the random access request by a fraction of a predefined device-specific maximum delay.

Optionally, the random access request includes a Random Access Channel, RACH, preamble.

By way of example, the wireless communication system may be based on Narrow Band Internet of Things, NB-IoT, radio access and the device is an IoT device.

In the following, the proposed technology will be described with reference to a set of non-limiting examples.

The inventors have realized that there is no non-blocking mechanism/primitive available for a network unit or network node such as an eNB to use to spread its preamble load over the hours of the day.

It may further be beneficial to make use of the basic assumption that certain applications like NB-IoT applications are not latency sensitive. It is envisaged that a network unit such as a network node like an eNB may broadcast information about a desired RACH-process delay to the devices.

It may be desirable for the network unit such as a network node like the eNB, based on the system load, to add information, e.g. in System Information Block x, SIBx, to enable UEs to optimally distribute their RACH attempts over time. The network unit may optionally consider historical load variations, remembering at what time instances the load is higher than usual and prevent RACH overload by changing the SIB information transmitted at (or preferably slightly before) these time instances to require increased distribution of UE random access attempts in time.

With the proposed solution there is a chance to be pro-active and prevent preamble collisions, since the UEs hosted by the network node are provided information that they could use to distribute their corresponding RACH over time. Since the solution builds on distributing the load over time, it is applicable also when the amount of RACH resources cannot be further increased.

Spreading system load, e.g. NB-IoT load, over time will also positively improve total system performance as fewer RACH attempts in general are needed to successfully transmit a given amount of data.

The proposed solution may also save battery by utilizing the fact that IoT devices have relaxed delay requirements.

In the following, a specific non-limiting example may be considered.

By way of example, the network unit part of the procedure for distributing the RACH attempts may include the following steps:

1) The network unit may select a desired value for a RACH delay indicator, e.g. based on current load and/or historical load at the current time of the day.

2) The SIB that the network unit such as a network node prepares may thus be updated according to the value of the RACH delay indicator selected in 1) and transmitted.

In step 1), the delay indicator could have a value that spreads the RACH attempts in the cell in a way so that the probability for RACH success on the first attempt will be high. For example, the RACH delay indicator may represent a maximum delay value in which the UEs will distribute their RACH attempts. It can also represent a relative delay value telling the UEs to spread the RACH attempts in a fraction of its predefined UE-specific maximum delay values. Note that load may be represented, e.g., as multipliers or variables in the equation used to distribute the RACH load. For simplicity we use the term load in this text. Both current load and historical load may be considered when the network unit selects a RACH delay indicator. By way of example, the historical load may be measured over e.g. 24 hours to make it possible to foresee moments of extreme load. The current load and historical load may have different weights when accounting for the load.

In a particular example, the RACH delay indicator represents a relative delay (e.g. a value between 0 and 1). The default value on the RACH delay indicator may be 0. This assumes low risk of RACH collisions and minimizes delay.

The network unit such as a network node may continuously store information on the RACH attempt intensity in the cell. This information may be stored together with a time stamp and the current value of the RACH delay indicator in the SIB.

If the pattern is repeated at the same time instant each e.g. day or week, and the RACH intensity is above a threshold, the RACH delay indicator may be increased compared to the value used at the last repetition (day/week . . . ).

The SIB may be updated with the new RACH delay indicator before the expected increase of RACH attempt intensity to allow time for the UEs to receive and update their RACH procedure.

In another example, instead of signaling the value of a RACH delay indicator, other information entities may be signaled to the NB-IoT device and used by the device for the purpose of adjusting the RACH delay. For example, a network node may signal a maximum delay, selected based on RACH load in its own cell. The maximum delay can be selected to be large enough so that there is a high probability that the device receives a response from the network after sending its first RACH preamble.

If the RACH load specifically is not available, the cell load level, e.g. the average resource utilization in the frequency band used for (NB-IoT) communication, can be used instead of the RACH load.

Another example is that the network node signals the (relative) RACH load, or possibly the (relative) cell load, to the device. The device may then adjust the RACH delay based on the RACH load.

In a particular example, it may be advantageous to predict bursts with high RACH load and spread RACH preamble transmissions over a longer period of time in case there is a burst, thereby reducing the risk of collisions.

In a sense, one aspect of the proposed technology relates to a signaling entity that carries said information from a network node to its associated devices such as NB-IoT devices.

Similarly, the inventors have also realized that there is no non-blocking mechanism/input parameter from the network node such as an eNB available for a device such as an IoT device that enables it to offset its random access request to day hours having less load, and consequently to hours of the day that potentially would require less battery spent per successfully transmitted bits.

An idea is to apply a time window within which a device or UE may choose to send its RACH preamble(s). Different UEs may transmit at different occasions within their window, to reduce uplink load.

As previously mentioned, it may be desirable to avoid RACH overload at specific time instances and thereby reduce battery consumption since fewer RACH attempts are needed.

In a particular example, a value defining the delay tolerance DelTol may be set in the UE (device). The value may depend on how time critical it is that data is reported after an intended transmission time. An example could be an electricity meter set to report at midnight every night with a DelTol value set to represent say 10 min.

Figure 11:
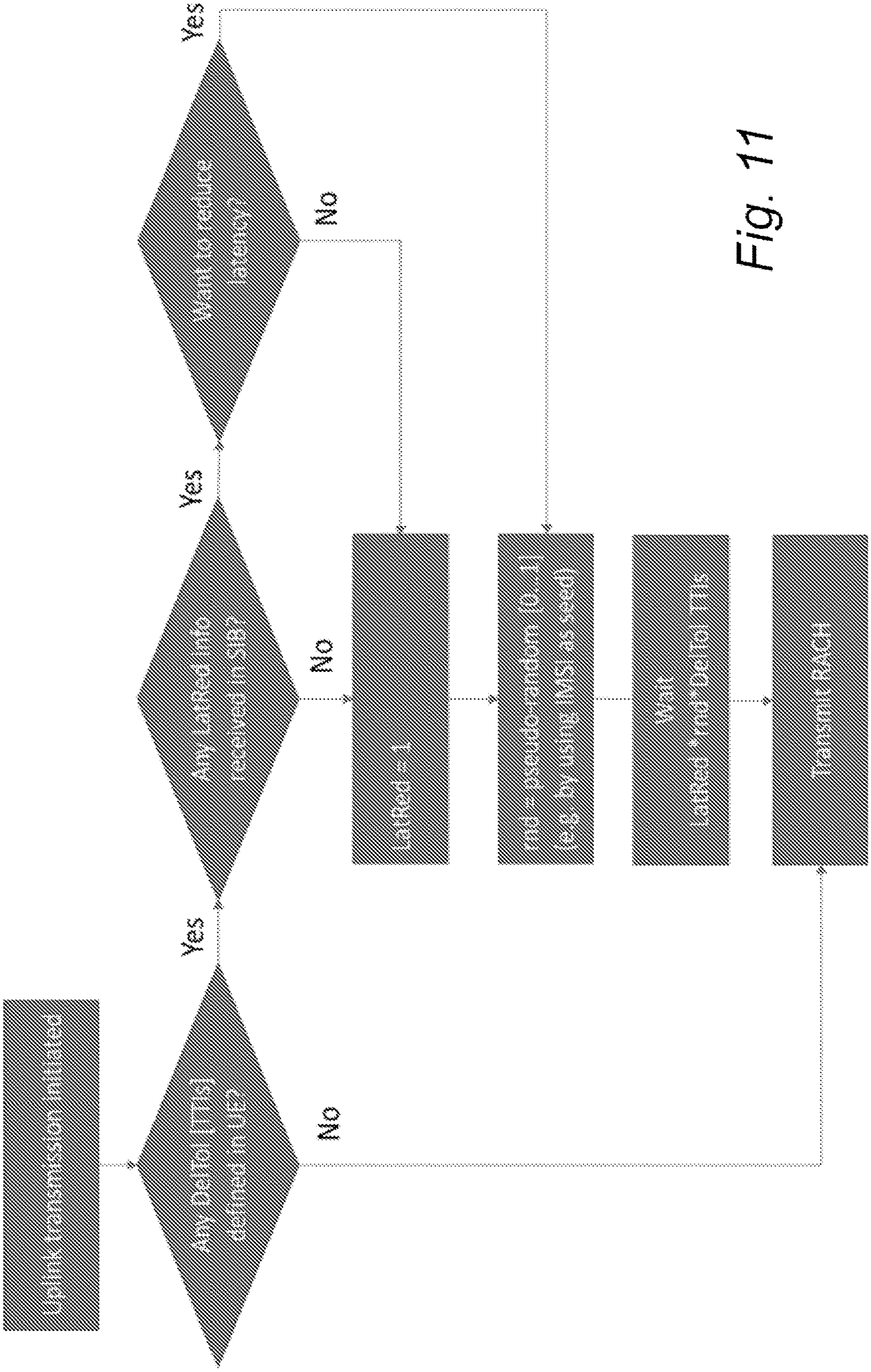
FIG. 11 is a schematic flow diagram illustrating a particular example of a method for selectively delaying random access attempts.

For example, reference can be made to FIG. 11, which is a schematic flow diagram illustrating a particular example of a method for selectively delaying random access attempts.

If DelTol is available, the UE calculates the actual RACH transmission time by multiplying DelTol with a random or semi-random value (rnd) between 0 and 1. If DelTol is set in transmission time intervals (TTIs), the first RACH attempt is then sent delayTTIs=rnd*DelTol TTIs after the time when the data was intended for transmission. The value rnd should be different for different UEs to spread the RACH attempts in time. It could for example be a pseudo-random value calculated from UE specific parameters such as IMSI and so forth.

By way of example, dynamic information on the need for spreading RACH transmissions can also be received from the network. The gain would be that the UE can choose to reduce latency when the predicted risk of collision is low. For example, that value is represented by LatRed with a range from 0 to 1 where 0 means no spread needed and 1 means maximum spread needed.

In a particular example, the random value rnd may be calculated from IMSI by rnd=reminder (IMSI, DelTol) or use IMSI as a seed for a pseudo-random value of rnd between 0 and 1. For example, the UE may wait delayTTIs=rnd*DelTol TTIs after the predefined intended transmission time until the first RACH is sent.

For example, the predefined intended transmission time may be based on a predefined periodic reporting time depending on the device type, e.g. a sensor reporting every full hour or daily at noon and so forth.

In another example, if the network has information that the risk for RACH collisions is low it can include a parameter DelFrac in a System Information Block (SIB) to inform all UEs in the cell of the reduced RACH collision risk. The UE can then choose to use DelFrac in the calculation of delayTTIs by: delayTTIs=rnd*DelTol*DelFrac Then the UE waits delayTTIs TTIs after the predefined transmission time until the first RACH is sent.

In a sense, DelFrac is an optional parameter received from the eNB, that may be used for reducing the delay if the system load is low.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a third aspect, there is provided a network unit configured to enable management of random access attempts in a wireless communication system by a plurality of devices having wireless communication capabilities. The network unit is configured to obtain information representing the load of random access attempts. The network unit is also configured to determine, based on the information representing the load of random access attempts, control information for controlling a distribution of the random access attempts over time.

By way of example, the network unit is configured to transmit the control information to at least a subset of the devices to enable the devices to perform the random access attempts distributed over time.

For example, the network unit may be configured to predict a burst of random access attempts by the devices based on the information representing the load of random access attempts. The network unit may further be configured to determine, in response to a predicted burst of random access attempts, the control information for enabling the devices to distribute the random access attempts over a period of time to at least partly prevent the burst of random access attempts.

In a particular example, the network unit is configured to transmit the control information to at least a subset of the devices for requesting the devices to distribute their random access attempts over a longer period of time, compared to when no burst of random access attempts is predicted.

For example, the network unit is configured to predict a burst of random access attempts by identifying, based on statistical analysis of load variations over time, at least one period when the load will be higher than average.

Optionally, the control information determined by the network unit enables the devices to spread the random access attempts at least partly to time periods during a day having lower load, compared to time periods having higher load.

In a particular example, the network unit is configured to determine the control information based on information representing current load and/or historical load of random access attempts.

By way of example, the network unit may be a network node, such as a network access node.

Alternatively, or complementary, the network unit may be a computer-based network unit such as a cloud-based network unit.

As an example, the wireless communication system is based on Narrow Band Internet of Things, NB-IoT, radio access and the devices include IoT devices.

Figure 12:
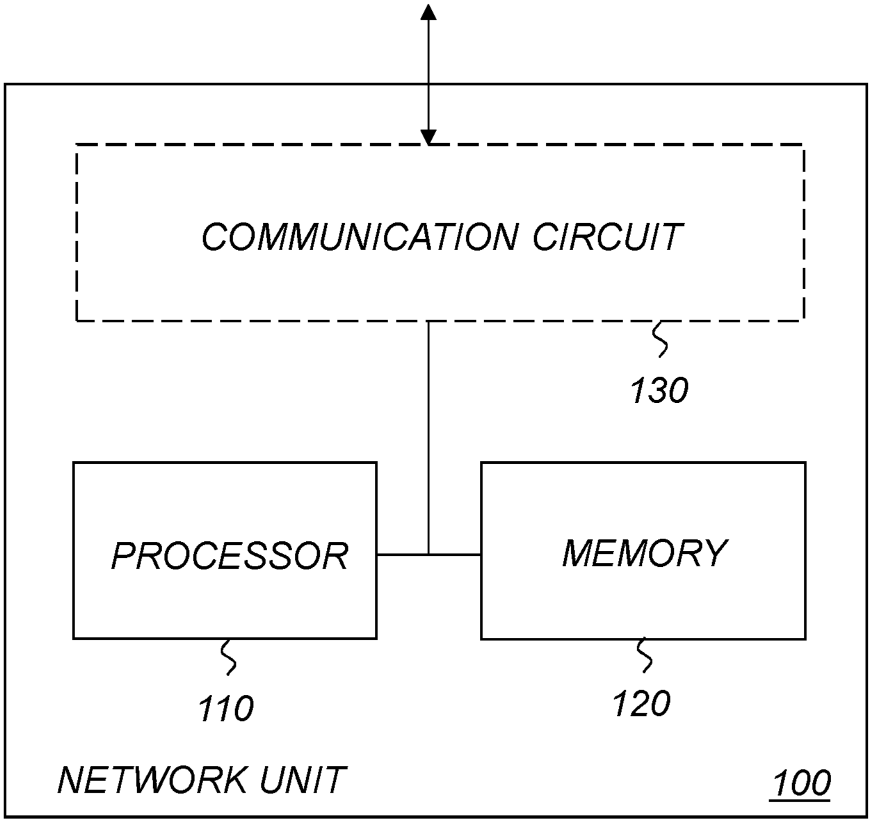
FIG. 12 is a schematic block diagram illustrating an example of a network unit according to an embodiment.

FIG. 12 is a schematic block diagram illustrating an example of a network unit according to an embodiment. In this particular example, the network unit 100 comprises a processor 110 and memory 120, wherein the memory 120 comprises instructions executable by the processor 110, whereby the processor is operative to enable management of the random access attempts.

According to a third aspect, there is provided a device having wireless communication capabilities and configured to enable management of a random access attempt in a wireless communication system. The device has at least one time instance intended for transmission of a random access request. The device is configured to define a delay time window within which the transmission of the random access request is allowed to be delayed with respect to the intended time instance(s). The device is also configured to determine a transmission time within the delay time window. The device is configured to determine the length of the delay time window and/or the transmission time within the delay time window based on device-specific information. Further, the device is configured to enable transmission of the random access request at the determined transmission time.

As an example, the device may be configured to determine the transmission time within the delay time window by calculating a semi-random value based on the device-specific information and determining the transmission time based on the calculated semi-random value.

For example, the wireless communication system may be based on Narrow Band Internet of Things, NB-IoT, radio access and the device is an IoT device.

Figure 13:
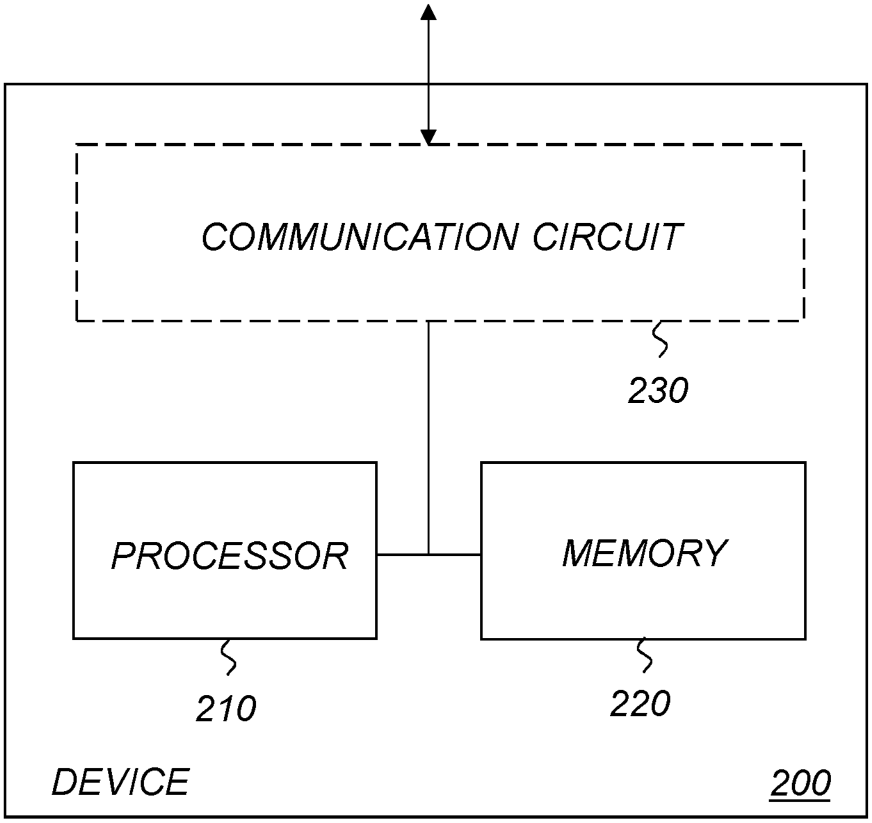
FIG. 13 is a schematic block diagram illustrating an example of a device according to an embodiment.

FIG. 13 is a schematic block diagram illustrating an example of a device according to an embodiment. In this particular example, the device 200 comprises a processor 210 and memory 220, wherein the memory 220 comprises instructions executable by the processor 210, whereby the processor is operative to manage the random access attempt.

According to a further aspect, there is also provided a wireless communication system comprising a network unit and a device as described herein.

Figure 14:
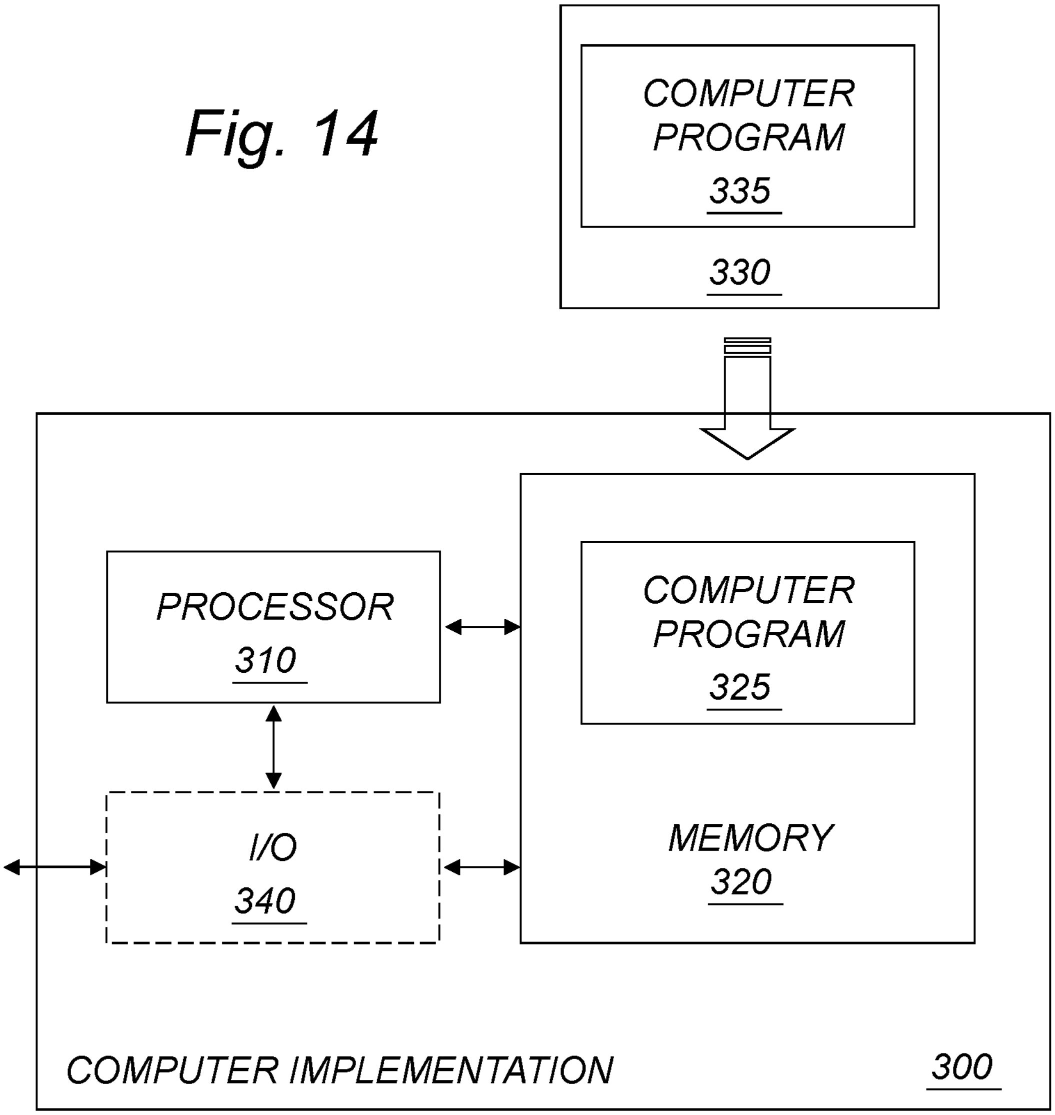
FIG. 14 is a schematic diagram illustrating an example of a computer implementation according to an embodiment.

FIG. 14 is a schematic diagram illustrating an example of a computer implementation 300 according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

It is also possible to provide a solution based on a combination of hardware and software. The actual hardware-software partitioning can be decided by a system designer based on a number of factors including processing speed, cost of implementation and other requirements.

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

In a particular aspect, there is provided a computer program 325; 335 for enabling, when executed, management of random access attempts in a wireless communication system by a plurality of devices having wireless communication capabilities. The computer program 325; 335 comprises instructions, which when executed by at least one processor 310, cause the at least one processor 310 to:

obtain information representing the load of random access attempts; and determine, based on the information representing the load of random access attempts, control information for controlling a distribution of the random access attempts over time.

In another particular aspect, there is provided a computer program 325; 335 for enabling, when executed, management of a random access attempt in a wireless communication system by a device having wireless communication capabilities, wherein the device has at least one time instance intended for transmission of a random access request. The computer program 325; 335 comprises instructions, which when executed by at least one processor 310, cause the at least one processor 310 to:

define a delay time window within which the transmission of the random access request is allowed to be delayed with respect to the intended time instance(s);

determine a transmission time within the delay time window, wherein the length of the delay time window and/or the transmission time within the delay time window is/are determined based on device-specific information; and enable transmission of the random access request at the determined transmission time.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile or non-transitory medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 15A:
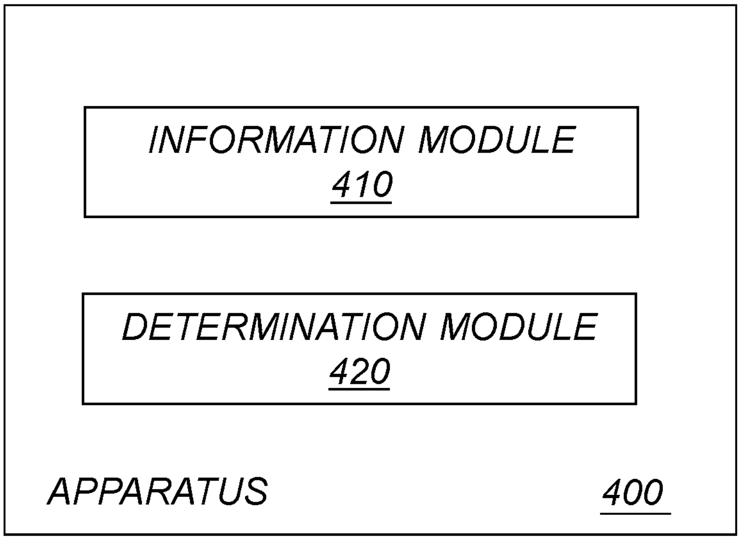
FIG. 15A is schematic diagram illustrating an example of an apparatus for enabling management of random access attempts in a wireless communication system.

FIG. 15A is a schematic diagram illustrating an example of an apparatus for enabling management of random access attempts in a wireless communication system by a plurality of devices having wireless communication capabilities. The apparatus 400 comprises:

an information module 410 for obtaining information representing the load of random access attempts; and a determination module 420 for determining, based on the information representing the load of random access attempts, control information for controlling a distribution of the random access attempts over time.

Figure 15B:
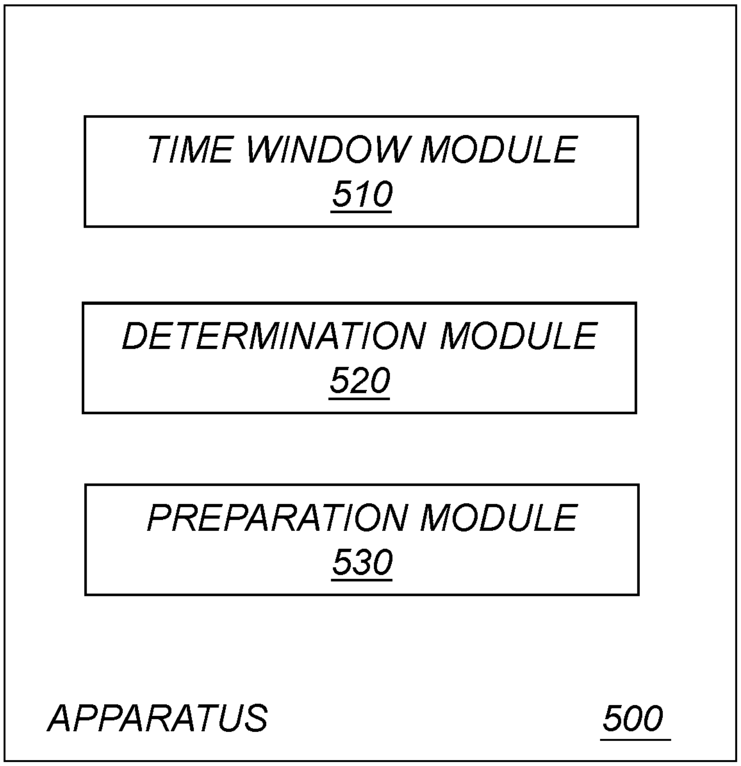
FIG. 15B is schematic diagram illustrating an example of an apparatus for enabling management of a random access attempt in a wireless communication system.

FIG. 15B is a schematic diagram illustrating an example of an apparatus for enabling management of a random access attempt in a wireless communication system by a device having wireless communication capabilities, wherein the device has at least one time instance intended for transmission of a random access request. The apparatus 500 comprises:

a time window module 510 for defining a delay time window within which the transmission of the random access request is allowed to be delayed with respect to the intended time instance(s);

a determination module 520 for determining a transmission time within the delay time window, wherein the length of the delay time window and/or the transmission time within the delay time window is/are determined based on device-specific information; and a preparation module 530 for preparing transmission of the random access request at the determined transmission time.

Alternatively it is possible to realize the module(s) in FIG. 15A and FIG. 15B predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 16:
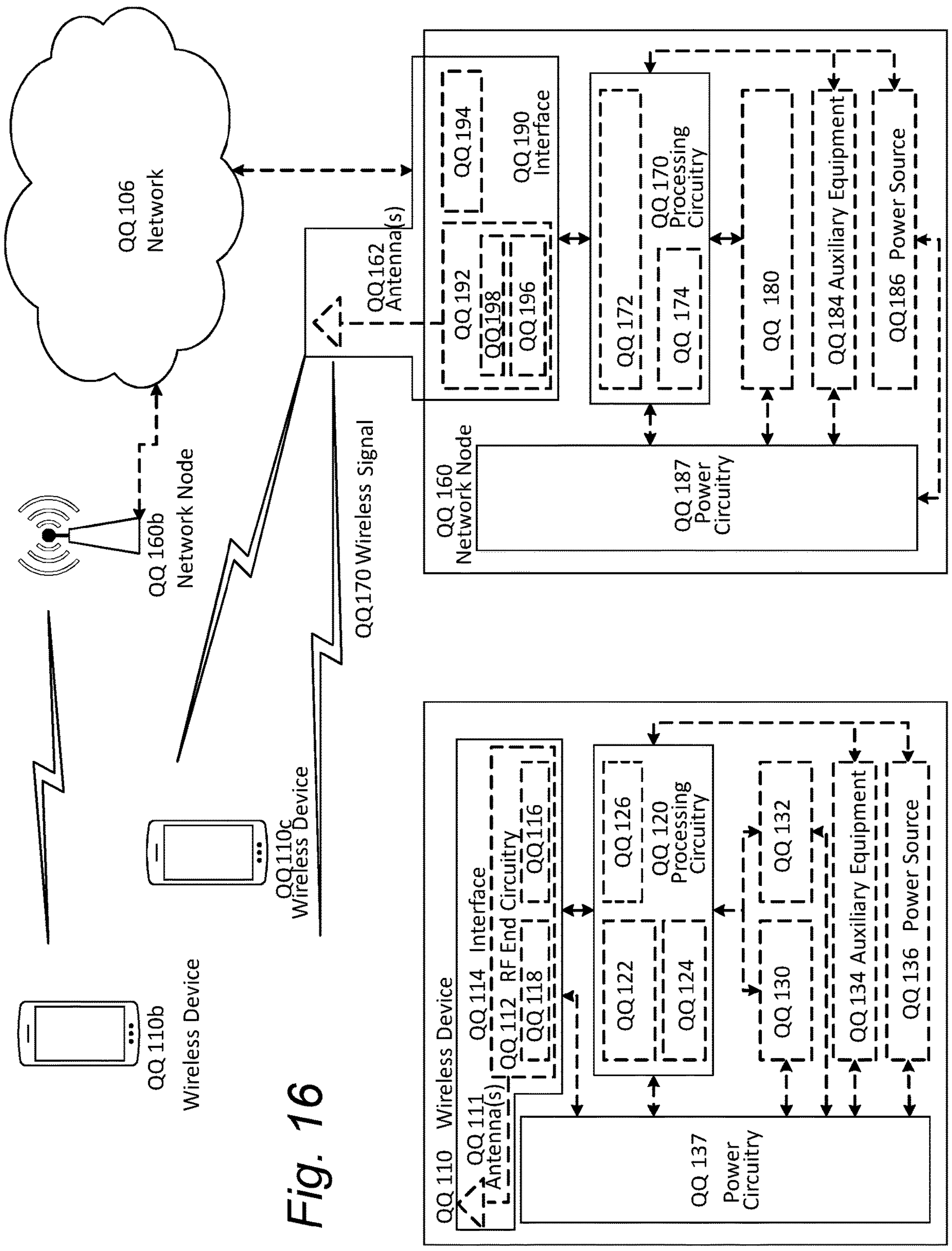
FIG. 16 is a schematic diagram illustrating an example of a wireless network in accordance with some embodiments.

By way of example, the "virtual" apparatus may be implemented in a wireless device or network node (e.g., wireless device QQ110 or network node QQ160 shown in FIG. 16). The apparatus is operable to carry out the example method(s) described herein, e.g. with reference to any of FIGS. 3-8 and possibly any other processes or methods disclosed herein. It is also to be understood that the method(s) of any of FIGS. 3-8 is not necessarily carried out solely by the apparatus in FIG. 15A or FIG. 15B. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services. There are different forms of virtualization that can be useful in this context, including one or more of:

- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

By way of example, Software Defined Networking (SDN) concerns the separation of the control and user plane of today's routers and switches. The user plane processing (e.g. filtering) and packet forwarding is in most cases performed in hardware by a switch which is controlled by a (centralized) SDN controller implemented in software. The SDN controller can update rules for packet processing and forwarding in the controlled switches e.g. using protocols such as OpenFlow. This makes it possible to gradually add more advanced functions to the network by updating the SDN controller. SDN can be seen as a lower level of separation of control and user plane compared to the separation of control and user plane nodes between Mobility Management Entities (MME) and Serving Gateway (S-GW) in System Architecture Evolution (SAE) and/or Long Term Evolution (LTE).

There is simultaneously a trend leading to consolidation of network functionality into virtualized software running on generic hardware in data centers. This trend is an operator driven forum known as Network Functions Virtualization (NFV) and aims to take specialized functionality like the functions performed by the mobile packet core such as packet inspection, firewall services, and specialized packet filtering (Quality-of-Service differentiation) and implement them in software running on generic hardware that is configured to orchestrate the required network functionality.

Storage and processing of large amount of data (a.k.a. Big Data) is becoming more and more important, even in real-time applications. Storing and processing of large and complex data from e.g. sensors and devices in the networked society often require distributed systems for analytics, collection, search, sharing, storage, transfer, anonymization and virtualization. While, for instance, data analytics as such is not a cloud technology, its implementation often is, especially if the data handled is large.

Distributed, large scale processing on commodity hardware often involves technologies for storage and processing on clusters of commodity hardware.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to management of random access attempts in wireless systems. In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 16-22.

FIG. 16 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used. Alternative embodiments of network node QQ160 may include additional components beyond those shown in FIG. 16 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, and so forth. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 17:
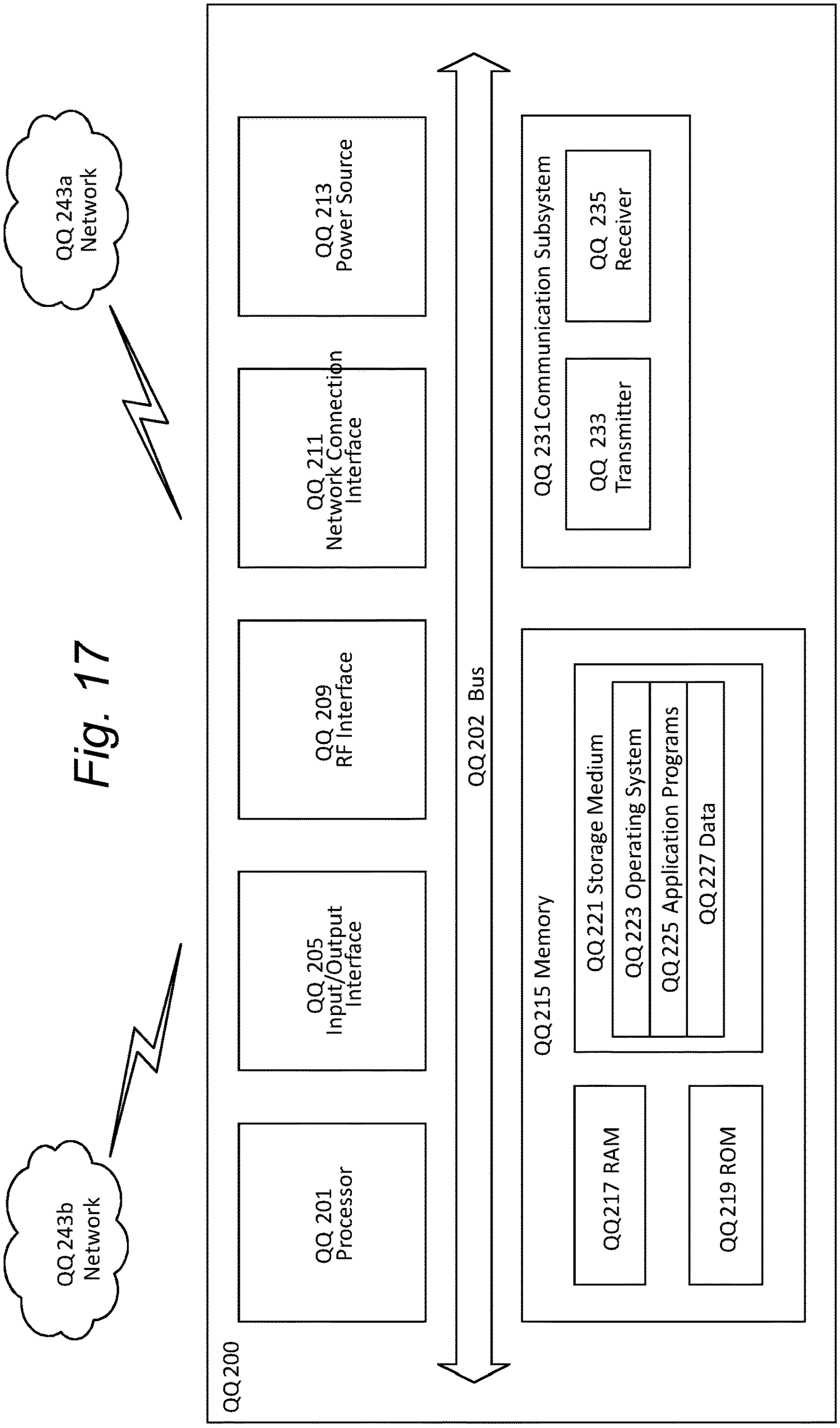
FIG. 17 is a schematic diagram illustrating an example of an embodiment of a UE in accordance with various aspects described herein.

FIG. 17 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 17, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 17, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/ or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 18:
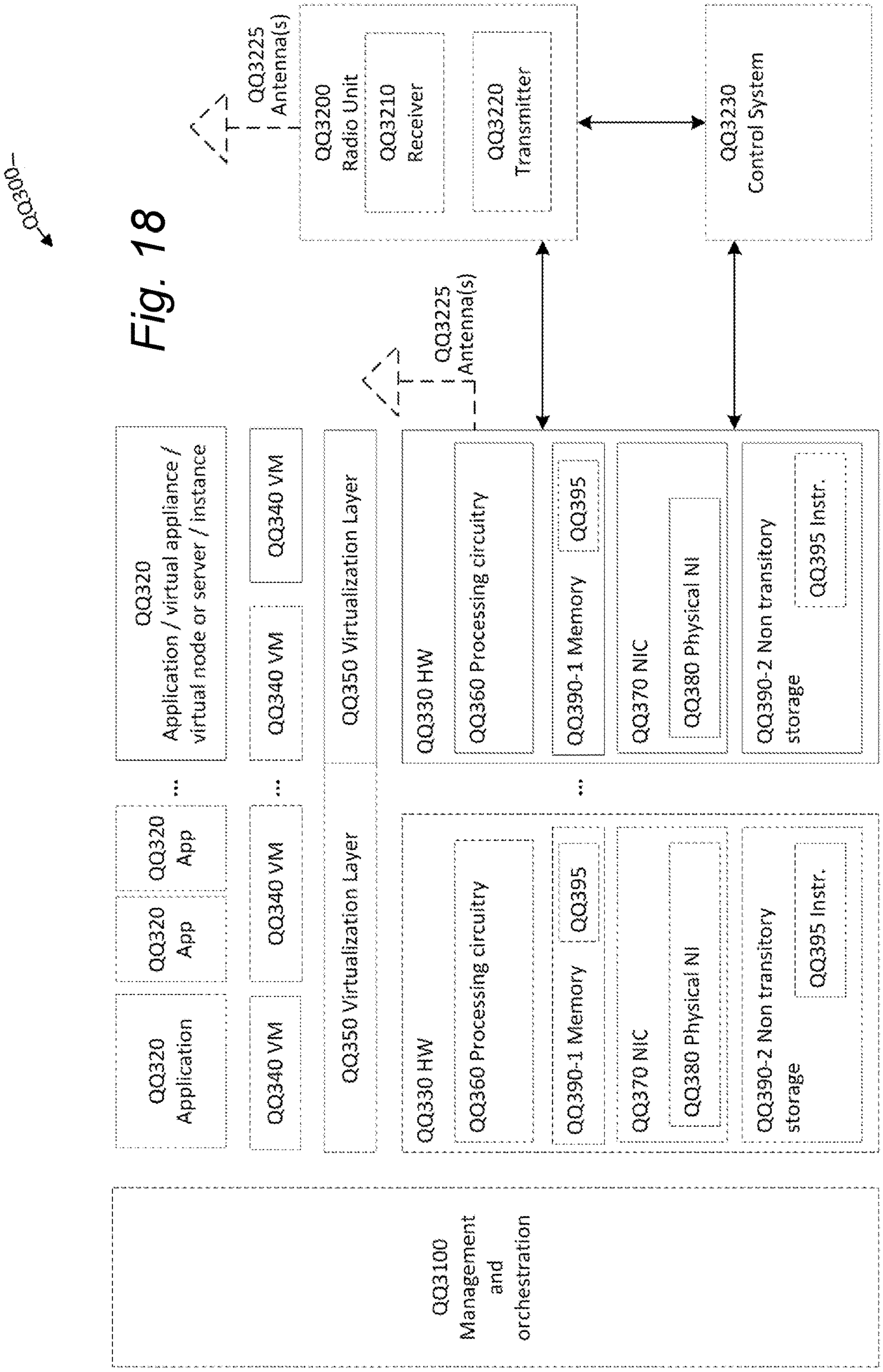
FIG. 18 is a schematic block diagram illustrating an example of a virtualization environment in which functions implemented by some embodiments may be virtualized.

FIG. 18 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 18, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 18.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 19:
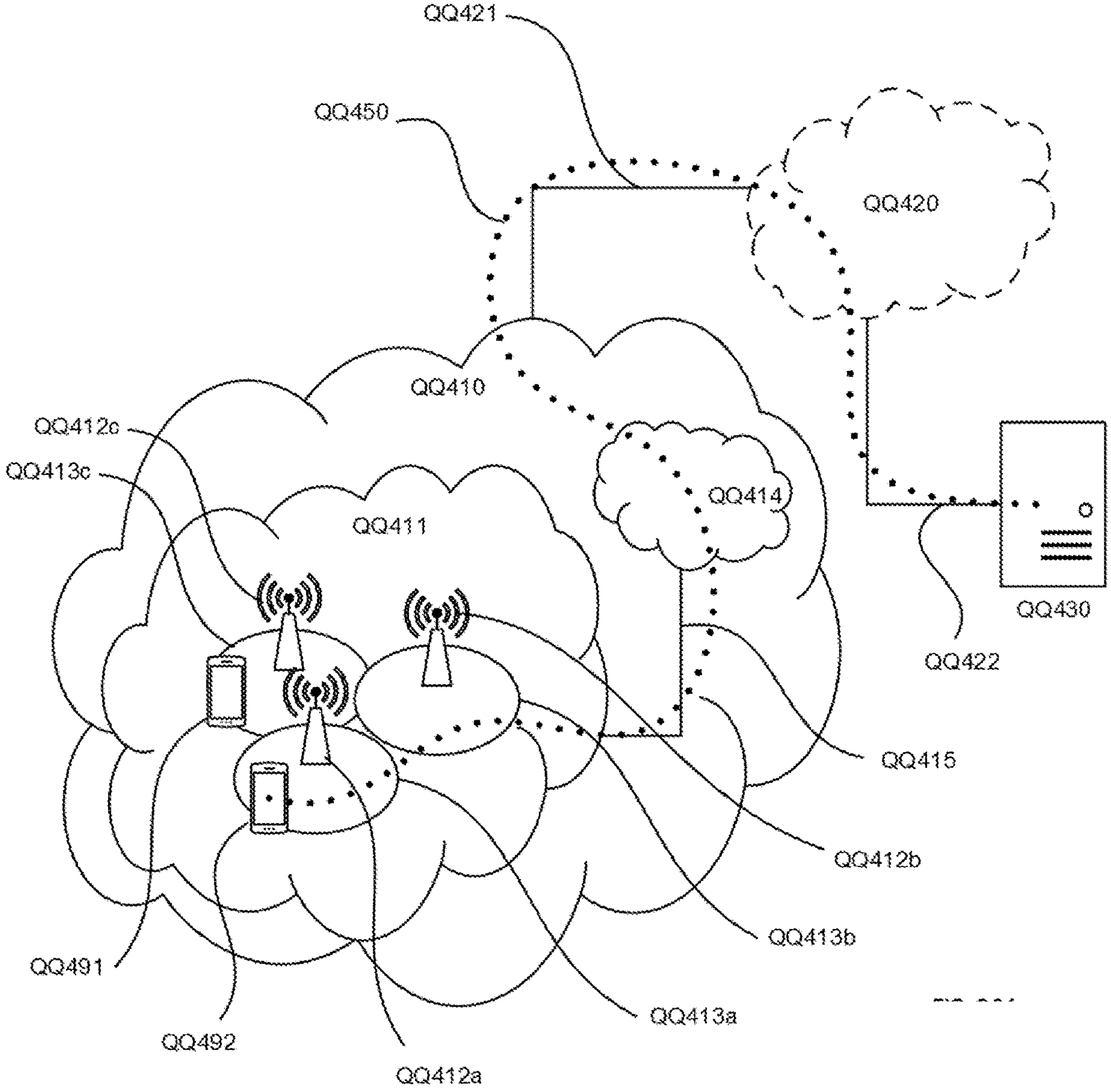
FIG. 19 is a schematic diagram illustrating an example of a telecommunication network connected via an intermediate network to a host computer in accordance with some embodiments.

FIG. 19 is a schematic diagram illustrating an example of a telecommunication network connected via an intermediate network to a host computer in accordance with some embodiments.

With reference to FIG. 19, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 19 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 20:
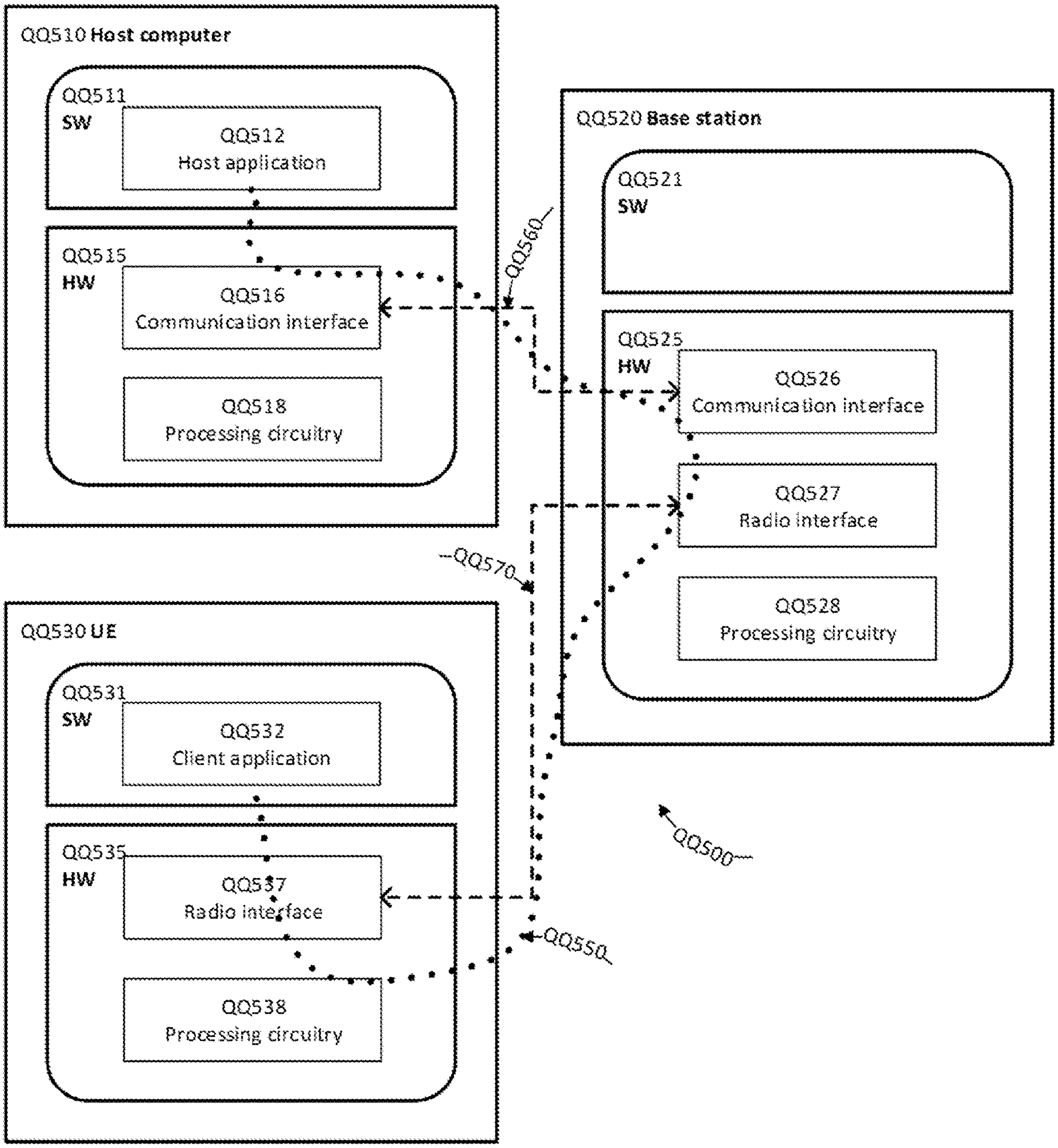
FIG. 20 is a schematic diagram illustrating an example of a host computer communicating via a base station with a user equipment over a partially wireless connection in accordance with some embodiments.

FIG. 20 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 20. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 20) served by base station QQ520. Communication interface QQ526 may be configured to facilitate connection QQ560 to host computer QQ510. Connection QQ560 may be direct or it may pass through a core network (not shown in FIG. 20) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 20 may be similar or identical to host computer QQ430, one of base stations QQ412*a*, QQ412*b*, QQ412*c* and one of UEs QQ491, QQ492 of FIG. 19, respectively. This is to say, the inner workings of these entities may be as shown in FIG. 20 and independently, the surrounding network topology may be that of FIG. 19.

In FIG. 20, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 21A:
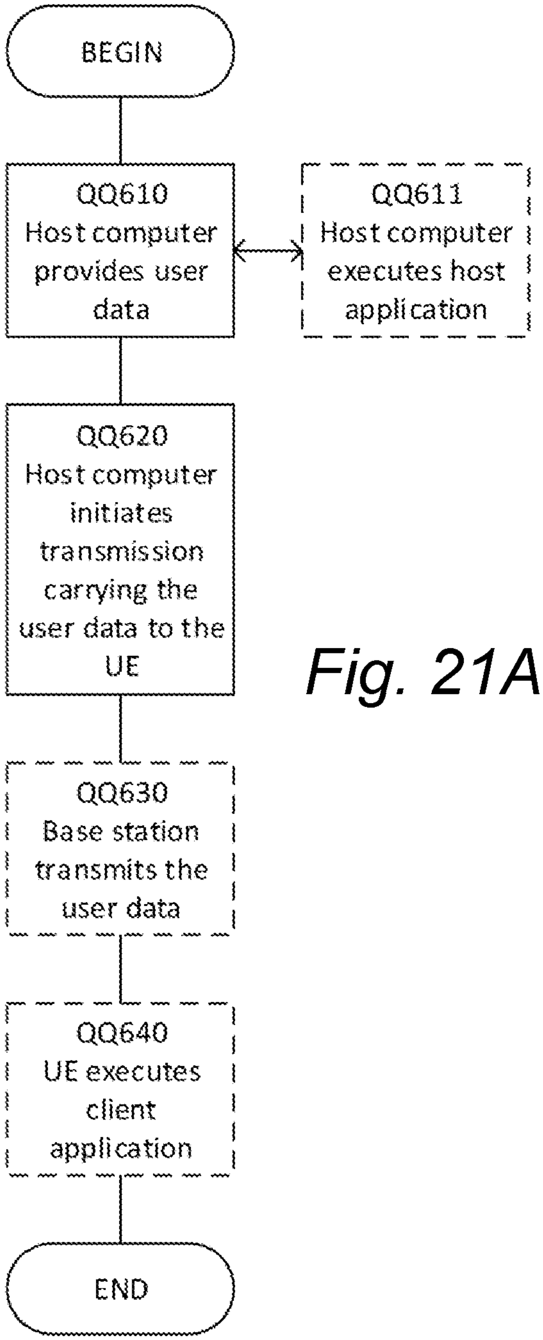
FIGS. 21A-B are schematic flow diagrams illustrating examples of methods implemented in a communication system including, e.g. a host computer, and optionally also a base station and a user equipment in accordance with some embodiments.
Figure 21B:
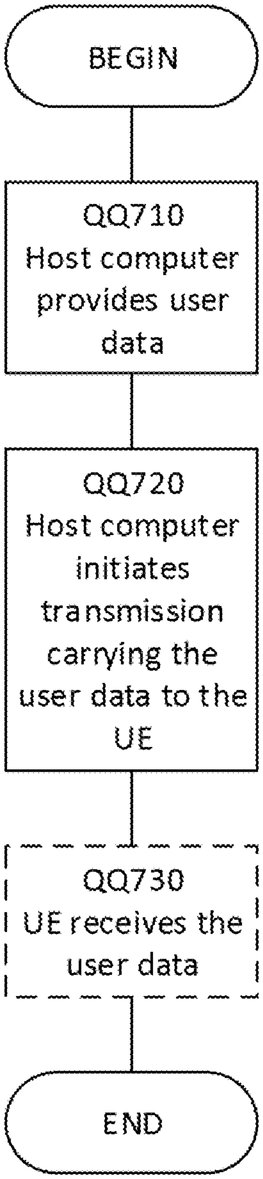

FIGS. 21A-B are schematic flow diagrams illustrating examples of methods implemented in a communication system including, e.g. a host computer, and optionally also a base station and a user equipment in accordance with some embodiments.

FIG. 21A is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 21A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 21B is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 21B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 22A:
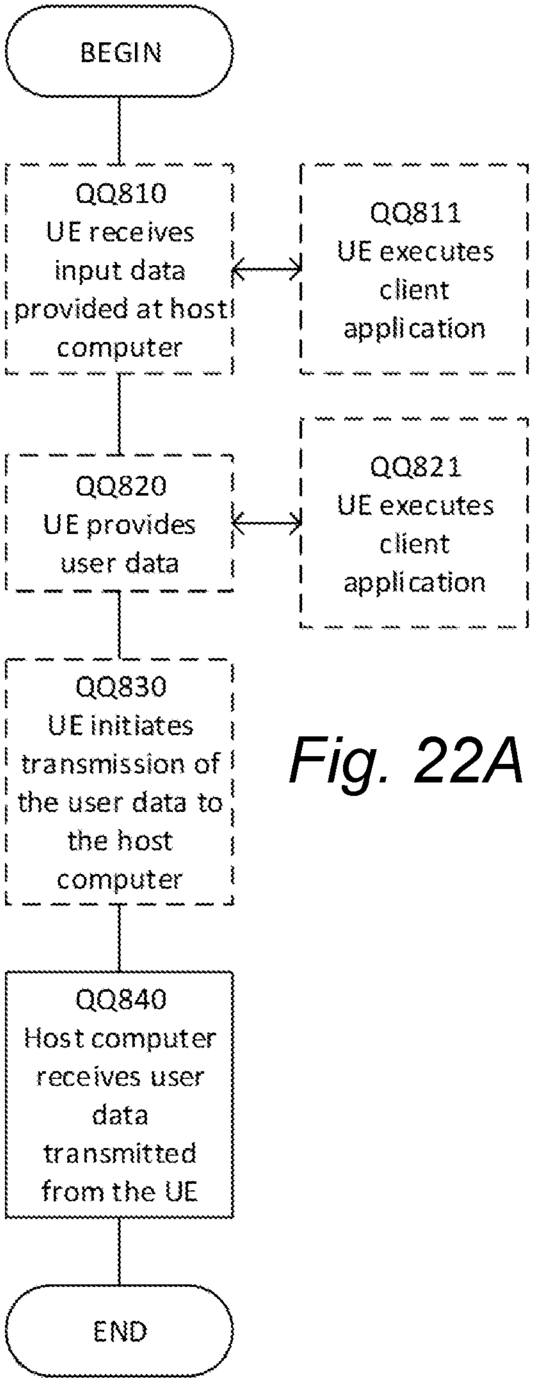
FIGS. 22A-B are schematic diagrams illustrating examples of methods implemented in a communication system including a host computer, a base station and a user equipment in accordance with some embodiments.
Figure 22B:
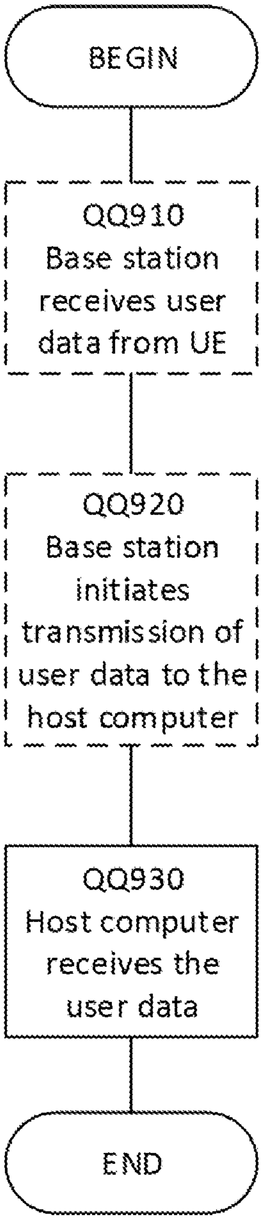

FIGS. 22A-B are schematic diagrams illustrating examples of methods implemented in a communication system including a host computer, a base station and a user equipment in accordance with some embodiments.

FIG. 22A is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 22A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 22B is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 22B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting embodiments will be given:

Group A Embodiments

1. A method performed by a wireless device for enabling management of a random access attempt in a wireless communication system, wherein the wireless device has at least one time instance intended for transmission of a random access request, the method comprising:
   defining (S11) a delay time window within which the transmission of the random access request is allowed to be delayed with respect to the intended time instance(s);
   determining (S12) a transmission time within the delay time window,
   wherein the length of the delay time window and/or the transmission time within the delay time window is/are determined based on device-specific information; and
   enabling (S13) transmission of the random access request at the determined transmission time.
2. The method of embodiment 1 further comprising transmitting the random access request at the determined transmission time.
3. The method of embodiment 1 or 2, further comprising:
   providing user data; and
   forwarding the user data to a host computer via the transmission to the target network node.

Group B Embodiments

4. A method performed by a network node for enabling management of random access attempts in a wireless communication system by a plurality of devices having wireless communication capabilities, wherein the method comprises:
   obtaining (S1) information representing the load of random access attempts; and
   determining (S2), based on the information representing the load of random access attempts, control information for controlling a distribution of the random access attempts over time.
5. The method of embodiment 4 further comprising transmitting (S3) the control information to at least a subset of the devices to enable the devices to perform the random access attempts distributed over time.
6. The method of any of the previous embodiments, further comprising:
   obtaining user data; and
   forwarding the user data to a host computer or a wireless device.

Group C Embodiments

7. A wireless device comprising processing circuitry configured to perform any of the steps of any of the Group A embodiments.
8. A network node such as a base station comprising processing circuitry configured to perform any of the steps of any of the Group B embodiments.
9. A user equipment (UE) comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
10. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.
11. The communication system of embodiment 10, further including the base station.

12. The communication system of embodiment 10 or 11, further including the UE, wherein the UE is configured to communicate with the base station.
13. The communication system of any of the embodiments 10 to 12, wherein:
    the processing circuitry of the host computer is configured to execute a host application, thereby providing the user data; and
    the UE comprises processing circuitry configured to execute a client application associated with the host application.
14. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.
15. The method of embodiment 14, further comprising, at the base station, transmitting the user data.
16. The method of the embodiment 14 or 15, wherein the user data is provided at the host computer by executing a host application, the method further comprising, at the UE, executing a client application associated with the host application.
17. A user equipment (UE) configured to communicate with a base station, the UE comprising a radio interface and processing circuitry configured to perform any of the steps of any of the Group A embodiments.
18. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.
19. The communication system of embodiment 18, wherein the cellular network further includes a base station configured to communicate with the UE.
20. The communication system of embodiment 18 or 19, wherein:
    the processing circuitry of the host computer is configured to execute a host application, thereby providing the user data; and
    the UE's processing circuitry is configured to execute a client application associated with the host application.
21. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.
22. The method of embodiment 21, further comprising at the UE, receiving the user data from the base station.
23. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.
24. The communication system of embodiment 23, further including the UE.
25. The communication system of embodiment 23 or 24, further including the base station, wherein the base station comprises a radio interface configured to communicate with the UE and a communication interface configured to forward to the host computer the user data carried by a transmission from the UE to the base station.
26. The communication system of any of the embodiments 23 to 25, wherein:
    the processing circuitry of the host computer is configured to execute a host application; and
    the UE's processing circuitry is configured to execute a client application associated with the host application, thereby providing the user data.
27. The communication system of any of the embodiments 23 to 26, wherein:
    the processing circuitry of the host computer is configured to execute a host application, thereby providing request data; and
    the UE's processing circuitry is configured to execute a client application associated with the host application, thereby providing the user data in response to the request data.
28. A method implemented in a communication system including a host computer, a base station and a user equipment (UE), the method comprising:
    at the host computer, receiving user data transmitted to the base station from the UE, wherein the UE performs any of the steps of any of the Group A embodiments.
29. The method of embodiment 28, further comprising, at the UE, providing the user data to the base station.
30. The method of embodiment 28 or 29, further comprising:
    at the UE, executing a client application, thereby providing the user data to be transmitted; and
    at the host computer, executing a host application associated with the client application.
31. The method of any of the embodiments 28 to 30, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
32. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
33. The communication system of embodiment 32 further including the base station.

34. The communication system of embodiment 32 or 33, further including the UE, wherein the UE is configured to communicate with the base station.
35. The communication system of any of the embodiments 32 to 34, wherein:
    the processing circuitry of the host computer is configured to execute a host application;
    the UE is configured to execute a client application associated with the host application, thereby providing the user data to be received by the host computer.
36. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
37. The method of embodiment 36, further comprising at the base station, receiving the user data from the UE.
38. The method of embodiment 36 or 37, further comprising at the base station, initiating a transmission of the received user data to the host computer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IMSI International Mobile Subscriber Identity
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NB-IoT NarrowBand Internet of Things
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method, performed by a network unit, for enabling management of random access attempts in a wireless communication system by a plurality of devices having wireless communication capabilities, wherein the method comprises:
- obtaining information representing load of random access attempts; and
- determining, based on the information representing the load of random access attempts, control information for controlling a distribution of the random access attempts over time,
- wherein the control information is represented by a delay indicator that represents a relative delay value informing each device to spread random access attempt of the corresponding device in a fraction of a predefined device-specific maximum delay value, and
- wherein the distribution of the random access attempts comprises:
  - selecting a desired value for a random access delay indicator based on current load or historical load at a current time of a day; and
  - preparing a System Information Block that is to be updated according to the selected value of the random access delay indicator,
- wherein the step of determining control information for controlling a distribution of the random access attempts over time comprises:
  - predicting a burst of random access attempts by the plurality of devices based on the information representing the load of random access attempts; and
  - determining, in response to a predicted burst of random access attempts, control information for enabling the plurality of devices to distribute the random access attempts over a period of time to at least partly prevent the burst of random access attempts.

2. The method of claim 1, wherein the step of predicting a burst of random access attempts comprises identifying, based on statistical analysis of load variations over time, at least one period when the load will be higher than average.

3. The method of claim 1, wherein the random access attempts are represented by Random Access Channel (RACH) preamble transmissions, and wherein the information representing the load of random access attempts is represented by RACH load.

4. The method of claim 1, wherein the method further comprises transmitting the control information to at least a subset of the plurality of devices to enable the plurality of devices to perform the random access attempts distributed over time.

5. A network unit configured to enable management of random access attempts in a wireless communication system by a plurality of devices having wireless communication capabilities, the network unit comprising:
- a processor; and
- memory operatively coupled to the processor and storing program code for execution by the processor, whereby the network unit is configured to:
  - obtain information representing load of random access attempts;
  - determine, based on the information representing the load of random access attempts, control information for controlling a distribution of the random access attempts over time;
  - predict a burst of random access attempts by the plurality of devices based on the information representing the load of random access attempts; and
  - determine, in response to a predicted burst of random access attempts, the control information for enabling the plurality of devices to distribute the random access attempts over a period of time to at least partly prevent the burst of random access attempts,
  - wherein the control information is represented by a delay indicator that represents a relative delay value informing each device to spread random access attempt of the corresponding device in a fraction of a predefined device-specific maximum delay value, and
  - wherein the distribution of the random access attempts comprises:
    - selecting a desired value for a random access delay indicator based on current load or historical load at a current time of a day; and
    - preparing a System Information Block that is to be updated according to the selected value of the random access delay indicator.

6. The network unit of claim 5, wherein the network unit is configured to predict a burst of random access attempts by identifying, based on statistical analysis of load variations over time, at least one period when the load will be higher than average.

7. The network unit of claim 5, wherein the wireless communication system is based on Narrow Band Internet of Things (NB-IoT) radio access and the plurality of devices include IoT devices.

8. The method of claim 1, wherein the method further comprises transmitting the control information to at least a subset of the plurality of devices for requesting the plurality of devices to distribute their random access attempts over a longer period of time, compared to when no burst of random access attempts is predicted by the network unit.

* * * * *